(12) United States Patent
Buazza et al.

(10) Patent No.: US 6,494,702 B1
(45) Date of Patent: Dec. 17, 2002

(54) APPARATUS FOR THE PRODUCTION OF PLASTIC LENSES

(75) Inventors: Omar M. Buazza; N. Thornton Lipscomb; Stephen C. Luetke, all of Louisville, KY (US); John J. Robinson, Cincinnati, OH (US)

(73) Assignee: Q2100, Inc., Louisville, KY (US)

( * ) Notice: Subject to any disclaimer, the term of this patent is extended or adjusted under 35 U.S.C. 154(b) by 0 days.

(21) Appl. No.: 08/439,691

(22) Filed: May 12, 1995

Related U.S. Application Data

(60) Division of application No. 07/800,561, filed on Dec. 6, 1991, now Pat. No. 5,415,816, which is a continuation-in-part of application No. 07/642,614, filed on Jan. 17, 1991, now abandoned, which is a continuation-in-part of application No. 07/425,371, filed on Oct. 26, 1989, now Pat. No. 6,201,037, which is a continuation-in-part of application No. 07/273,428, filed on Nov. 18, 1988, now Pat. No. 4,879,318, which is a continuation-in-part of application No. 07/021,913, filed on Mar. 4, 1987, now abandoned, which is a continuation-in-part of application No. 06/823,339, filed on Jan. 28, 1986, now Pat. No. 4,728,469.

(51) Int. Cl.[7] .................... B29C 33/04; B29C 35/08; B29C 35/16; B29D 11/00

(52) U.S. Cl. .................. 425/174.4; 425/407; 425/808

(58) Field of Search .............. 425/72.1, 72.2, 425/174.4, 808, 552, 547, 407, 555, 378.1, 384, 174.1; 264/1.32, 22, 24, 49

(56) References Cited

U.S. PATENT DOCUMENTS

| 1,518,405 A | 12/1924 | Glancy |
|---|---|---|
| 2,193,742 A | 3/1940 | Rohm et al. |
| 2,370,565 A | 2/1945 | Muskat et al. |
| 2,370,567 A | 2/1945 | Muskat et al. |
| 2,379,218 A | 6/1945 | Dial et al. |
| 2,384,115 A | 9/1945 | Muskat et al. |
| 2,403,112 A | 7/1946 | Muskat |
| 2,403,113 A | 7/1946 | Muskat et al. |
| 2,455,652 A | 12/1948 | Bralley et al. |
| 2,455,653 A | 12/1948 | Bralley et al. |

(List continued on next page.)

FOREIGN PATENT DOCUMENTS

| AU | AU-B-18738/83 | 3/1984 |
|---|---|---|
| CA | 1 199 762 | 1/1986 |
| CA | 1244593 | 11/1988 |
| DE | 1 629 263 | 1/1971 |
| DE | 2 060 976 | 6/1972 |
| DE | 27 34 416 | 2/1978 |
| DE | 3428 645 A1 | 2/1985 |
| DE | 37 15412 A1 | 11/1992 |
| EP | 0 028 975 | 5/1981 |

(List continued on next page.)

OTHER PUBLICATIONS

Brochure from PPG Industries—HIRI Casting Resin "The New HIRI High–Index Casting Resin from PPG" (No date).
Leaflet from PPG Industries—CR–39 Monomer (No date).
Brochure from Goldenwest Mfg. Inc.—Fast Cast—FC "Brings New Ideas to Life in Less Than 15 Minutes" (No date).
Article from *Et Ultra* "The Peptide Connection" Winter–Spring 1989.
"Kinetics and Mechanism of the Benzoin Isobutyl Ether Photoinitiated Polymerization of Styrene" Lipscomb et al. *Journal of Polymer Science: Part A: Polymer Chemistry*, vol. 26, 529–540 (1988).

(List continued on next page.)

*Primary Examiner*—Robert Davis
(74) *Attorney, Agent, or Firm*—Conley, Rose & Tayon, P.C.

(57) ABSTRACT

Apparatus for making a plastic lens. Apparatus includes a mold cavity and a cooling fluid distributor. The apparatus is adapted to produce a plastic lens from a liquid composition.

38 Claims, 6 Drawing Sheets

U.S. PATENT DOCUMENTS

| | | | |
|---|---|---|---|
| 2,479,522 A | 8/1949 | Strain | |
| 2,479,935 A | 8/1949 | Johnson | |
| 2,524,862 A | 10/1950 | White | |
| 2,525,664 A | 10/1950 | Gadsby et al. | |
| 2,529,866 A | 11/1950 | Carlson | |
| 2,529,867 A | 11/1950 | Carlson | |
| 2,542,386 A | 2/1951 | Beattie | |
| 2,542,827 A | 2/1951 | Minter | |
| 2,547,696 A | 4/1951 | Foster | |
| 2,548,141 A | 4/1951 | Bralley | |
| 2,568,658 A | 9/1951 | Pope | |
| 2,587,437 A | 2/1952 | Bralley et al. | |
| 2,587,442 A | 2/1952 | Carlson | |
| 2,964,501 A | 12/1960 | Sarofeen | |
| 3,038,210 A | 6/1962 | Hungerford et al. | |
| 3,070,846 A | 1/1963 | Schrier | |
| 3,171,869 A | 3/1965 | Weinberg | |
| 3,210,297 A | 10/1965 | Fischer et al. | |
| 3,222,432 A | 12/1965 | Grandperret | |
| 3,248,460 A | 4/1966 | Naujokas | |
| 3,278,654 A | 10/1966 | Grandperret | |
| 3,306,723 A | 2/1967 | Forber | |
| 3,320,344 A | 5/1967 | Slipp | |
| 3,364,291 A | 1/1968 | Deichert et al. | |
| 3,364,525 A | 1/1968 | Davy et al. | |
| 3,422,168 A | 1/1969 | Bowser | |
| 3,423,488 A | 1/1969 | Bowser | |
| 3,452,124 A | 6/1969 | Knapp | |
| 3,465,076 A | 9/1969 | Asami et al. | |
| 3,469,254 A | 9/1969 | Wichterle | |
| 3,497,577 A | 2/1970 | Wichterle | |
| 3,503,942 A | 3/1970 | Seiderman | |
| 3,518,341 A | 6/1970 | Haryu | |
| 3,551,235 A | 12/1970 | Bassemir | |
| 3,557,249 A | 1/1971 | Dannels et al. | |
| 3,605,195 A | 9/1971 | Campbell | |
| 3,660,545 A | 5/1972 | Wichterle | |
| 3,720,827 A | 3/1973 | Hemphill | |
| 3,745,042 A | 7/1973 | Lim et al. | |
| 3,779,995 A | 12/1973 | Dannels et al. | |
| 3,806,079 A | 4/1974 | Beattie | |
| 3,808,178 A | 4/1974 | Gaylord | |
| 3,844,916 A | 10/1974 | Gaske | |
| 3,872,042 A | 3/1975 | Bond | |
| 3,914,165 A | 10/1975 | Gaske | |
| 3,915,609 A | 10/1975 | Robinson | |
| 3,916,033 A | 10/1975 | Merrill | |
| 3,925,349 A | 12/1975 | Gaske | |
| 3,938,775 A | 2/1976 | Sarofeen | |
| 3,953,115 A | 4/1976 | French et al. | |
| 3,955,035 A | 5/1976 | Ito et al. | |
| 3,970,417 A | 7/1976 | Page | |
| 3,971,872 A | 7/1976 | LeBoeuf | |
| 3,978,178 A | 8/1976 | Oshima et al. | |
| 3,989,609 A | 11/1976 | Brack | |
| 3,991,234 A | 11/1976 | Chang et al. | |
| D243,394 S | 2/1977 | Nerad et al. | |
| 4,014,771 A | 3/1977 | Rosenkranz et al. | |
| 4,022,855 A | 5/1977 | Hamblen | |
| 4,031,163 A | 6/1977 | Vollkommer et al. | |
| 4,041,120 A | 8/1977 | Oshima et al. | |
| 4,064,308 A | 12/1977 | Laurin | |
| 4,069,168 A | 1/1978 | Leatherman et al. | |
| 4,071,424 A | 1/1978 | Dart et al. | |
| 4,091,050 A | 5/1978 | McDonald | |
| 4,095,772 A | 6/1978 | Weber | |
| 4,113,224 A | 9/1978 | Clark et al. | |
| 4,120,570 A | 10/1978 | Gaylord | |
| 4,126,527 A | 11/1978 | Kaufman | |
| 4,127,697 A | 11/1978 | Laurin | |
| 4,132,518 A | 1/1979 | Rips | |
| 4,138,538 A | 2/1979 | Kaetsu et al. | |
| 4,139,177 A * | 2/1979 | Hanning | 425/552 |
| 4,139,578 A | 2/1979 | Baughman et al. | |
| 4,139,692 A | 2/1979 | Tanaka et al. | |
| 4,144,262 A | 3/1979 | Stevens | |
| 4,146,696 A | 3/1979 | Bond et al. | |
| 4,152,508 A | 5/1979 | Ellis et al. | |
| 4,164,099 A | 8/1979 | Grant | |
| 4,166,088 A | 8/1979 | Neefe | |
| 4,181,627 A | 1/1980 | Weiher et al. | |
| 4,191,717 A | 3/1980 | Weber | |
| 4,191,804 A | 3/1980 | Weber | |
| 4,197,226 A | 4/1980 | Clark et al. | |
| 4,199,421 A | 4/1980 | Kamada et al. | |
| 4,202,226 A | 5/1980 | Becker et al. | |
| 4,205,154 A | 5/1980 | Stevens | |
| 4,217,433 A | 8/1980 | Dyball | |
| 4,227,950 A | 10/1980 | Spycher | |
| 4,246,207 A * | 1/1981 | Spycher | 425/808 |
| 4,251,474 A | 2/1981 | Blandin | |
| 4,252,753 A | 2/1981 | Rips | |
| 4,257,988 A | 3/1981 | Matos et al. | |
| 4,260,564 A | 4/1981 | Baiocchi et al. | |
| 4,273,799 A | 6/1981 | Kamada et al. | |
| 4,273,809 A | 6/1981 | LaLiberte et al. | |
| 4,284,399 A * | 8/1981 | Newcomb et al. | 425/808 |
| 4,298,005 A | 11/1981 | Mutzhas | |
| 4,306,780 A | 12/1981 | Tarumi et al. | |
| 4,306,954 A | 12/1981 | Wendling et al. | |
| 4,308,400 A | 12/1981 | Felder et al. | |
| 4,310,642 A | 1/1982 | Margotte et al. | |
| 4,311,762 A | 1/1982 | Spycher et al. | |
| 4,313,355 A | 2/1982 | Becker et al. | |
| 4,327,045 A * | 4/1982 | Nishikawa et al. | 425/DIG. 9 |
| 4,342,863 A | 8/1982 | Hohokabe et al. | |
| 4,345,546 A | 8/1982 | Weber | |
| 4,346,197 A | 8/1982 | Crano et al. | |
| 4,347,302 A | 8/1982 | Gotman | |
| 4,360,637 A | 11/1982 | Schwarz | |
| 4,369,298 A | 1/1983 | Kida et al. | |
| 4,376,800 A | 3/1983 | Lu et al. | |
| 4,378,250 A | 3/1983 | Treadway et al. | |
| 4,382,902 A | 5/1983 | Feurer | |
| 4,390,482 A | 6/1983 | Feurer | |
| 4,408,016 A | 10/1983 | Eads et al. | |
| 4,416,837 A | 11/1983 | Neefe | |
| 4,417,790 A | 11/1983 | Dawson et al. | |
| 4,432,832 A | 2/1984 | Fantone | |
| 4,440,699 A | 4/1984 | Smid et al. | |
| 4,440,909 A | 4/1984 | Crano et al. | |
| 4,441,795 A | 4/1984 | Lobdell | |
| 4,447,468 A | 5/1984 | Keable | |
| 4,455,322 A | 6/1984 | Weber | |
| 4,476,162 A | 10/1984 | Ireland | |
| 4,487,904 A | 12/1984 | Fukuda et al. | |
| 4,490,495 A | 12/1984 | Weber | |
| 4,497,754 A | 2/1985 | Padoan | |
| 4,506,951 A | 3/1985 | Yamada | |
| 4,512,340 A | 4/1985 | Buck | |
| 4,518,756 A | 5/1985 | Yoshida et al. | |
| 4,522,768 A | 6/1985 | Roscrow et al. | |
| 4,528,351 A | 7/1985 | Tarumi et al. | |
| 4,534,915 A | 8/1985 | Neefe | |
| 4,536,267 A | 8/1985 | Ito et al. | |
| 4,537,732 A | 8/1985 | Ueda et al. | |
| 4,542,201 A | 9/1985 | Kanemura et al. | |
| 4,543,146 A | 9/1985 | Petcen | |
| 4,544,572 A | 10/1985 | Sandvig et al. | |
| 4,547,397 A | 10/1985 | Burzynski et al. | |
| 4,551,361 A | 11/1985 | Burzynski et al. | |

| | | | | | |
|---|---|---|---|---|---|
| 4,556,605 A | 12/1985 | Mogami et al. | 4,902,725 A | 2/1990 | Moore |
| 4,561,951 A | 12/1985 | Neckers | 4,904,525 A | 2/1990 | Taniguchi et al. |
| 4,586,996 A | 5/1986 | Shinohara | 4,911,538 A | 3/1990 | Robb |
| 4,589,231 A | 5/1986 | Roberts | 4,912,185 A | 3/1990 | Toh |
| 4,590,248 A | 5/1986 | Moriya et al. | 4,919,850 A | 4/1990 | Blum et al. |
| 4,594,288 A | 6/1986 | Dobigny et al. | 4,927,480 A | 5/1990 | Vaughan |
| 4,607,087 A | 8/1986 | Moriya et al. | 4,929,707 A | 5/1990 | Nagata et al. |
| 4,609,267 A | 9/1986 | Deguchi et al. | 4,931,220 A | 6/1990 | Haynes et al. |
| 4,613,656 A | 9/1986 | Tang | 4,931,523 A | 6/1990 | Watanabe et al. |
| 4,620,954 A | 11/1986 | Singer et al. | 4,936,995 A | 6/1990 | Kwiatkowski |
| 4,622,376 A | 11/1986 | Misura et al. | 4,946,923 A | 8/1990 | Nagata et al. |
| 4,623,497 A * | 11/1986 | Waters ........................ 425/552 | 4,948,447 A | 8/1990 | Clarke et al. |
| 4,623,708 A | 11/1986 | Ezrielev et al. | 4,950,041 A | 8/1990 | Robb |
| 4,632,773 A | 12/1986 | Neefe | 4,955,804 A | 9/1990 | Martell et al. |
| 4,636,212 A | 1/1987 | Posin et al. | 4,959,429 A | 9/1990 | Misura et al. |
| 4,637,698 A | 1/1987 | Kwak et al. | 4,979,888 A | 12/1990 | Bauer et al. |
| 4,640,489 A * | 2/1987 | Larsen ........................ 425/808 | 4,983,335 A | 1/1991 | Matsuo et al. |
| 4,640,805 A | 2/1987 | Neefe | 4,988,274 A | 1/1991 | Kenmochi |
| 4,643,537 A | 2/1987 | Vance | 5,049,321 A | 9/1991 | Galic |
| 4,655,005 A | 4/1987 | Roberts | 5,135,686 A | 8/1992 | Masuhara et al. |
| 4,663,183 A | 5/1987 | Ovshinsky et al. | 5,164,228 A | 11/1992 | Peralta et al. |
| 4,666,976 A | 5/1987 | Misura | 5,210,553 A | 5/1993 | Barth et al. |
| 4,668,751 A | 5/1987 | Nakamoto et al. | 5,246,499 A | 9/1993 | Peralta et al. |
| 4,676,610 A | 6/1987 | Barkan et al. | 5,248,529 A | 9/1993 | Hammond et al. |
| 4,686,266 A | 8/1987 | Tang | 5,364,256 A | 11/1994 | Lipscomb et al. |
| 4,693,446 A | 9/1987 | Orlosky | | | |
| 4,695,399 A | 9/1987 | Neefe | | | |

FOREIGN PATENT DOCUMENTS

| | | |
|---|---|---|
| EP | 0 095 121 A2 | 11/1983 |
| EP | 0 102 847 | 3/1984 |
| EP | 1 102 847 B1 | 3/1984 |
| EP | 0 107 104 | 5/1984 |
| EP | 0 183 324 | 6/1986 |
| EP | 0 207 640 | 1/1987 |
| EP | 0224123 | 6/1987 |
| EP | 0226123 | 6/1987 |
| EP | 0 226 123 | 6/1987 |
| EP | 0 274 595 A2 | 7/1988 |
| EP | 0299628 | 1/1989 |
| EP | 0 314 417 | 5/1989 |
| EP | 0 318 164 | 5/1989 |
| EP | 0322353 | 6/1989 |
| EP | 0 322 353 | 6/1989 |
| EP | 0 346 996 A3 | 12/1989 |
| EP | 0 439 394 A2 | 7/1991 |
| FR | 2 329 427 | 5/1977 |
| FR | 2551223 | 6/1984 |
| GB | 567778 | 3/1945 |
| GB | 630026 | 10/1949 |
| GB | 1 347 762 | 2/1974 |
| GB | 1 378 971 | 1/1975 |
| GB | 2 006 114 | 5/1979 |
| GB | 2082107 | 3/1982 |
| GB | 2155940 | 10/1985 |
| JP | Sho-49-31768/1974 | 3/1974 |
| JP | 52-126474 | 10/1977 |
| JP | 55-132221 | 10/1980 |
| JP | Sho1980-55-132221 | 10/1980 |
| JP | Sho-57-85002/1982 | 5/1982 |
| JP | Sho-58-107501/1983 | 6/1983 |
| JP | 58-167125 | 10/1983 |
| JP | Sho-58-45445/1983 | 10/1983 |
| JP | 59-39526 | 3/1984 |
| JP | Sho 59-86603 | 5/1984 |
| JP | Sho-59-86615/1984 | 5/1984 |
| JP | 39-17442 | 8/1984 |
| JP | Sho-59-193915/1984 | 11/1984 |
| JP | 60-245607 | 12/1985 |
| JP | Sho-62-25162-1987 | 6/1987 |
| JP | 62-288030 | 12/1987 |
| JP | Sho 621987-288030 | 12/1987 |
| JP | 3-184001 | 6/1992 |

Additional US references (continued):

| | | |
|---|---|---|
| 4,701,288 A | 10/1987 | Cook et al. |
| 4,702,574 A | 10/1987 | Bawa |
| 4,721,377 A | 1/1988 | Fukuda et al. |
| 4,728,469 A | 3/1988 | Danner et al. |
| 4,732,715 A | 3/1988 | Bawa et al. |
| 4,737,447 A | 4/1988 | Suzuki et al. |
| 4,742,133 A | 5/1988 | Tang et al. |
| 4,745,168 A | 5/1988 | Nakamoto et al. |
| 4,746,716 A | 5/1988 | Oates |
| 4,756,972 A | 7/1988 | Kloosterboer et al. |
| 4,757,129 A | 7/1988 | Oates |
| 4,758,448 A | 7/1988 | Sandvig et al. |
| 4,774,035 A | 9/1988 | Carmelite et al. |
| 4,774,282 A | 9/1988 | Quershi |
| 4,775,733 A | 10/1988 | Kanemura et al. |
| 4,783,361 A | 11/1988 | Ovshinsky et al. |
| 4,789,318 A | 12/1988 | Ehritt |
| 4,791,185 A | 12/1988 | Kanemura et al. |
| 4,792,224 A | 12/1988 | Kwiatkowski et al. |
| 4,795,461 A | 1/1989 | Lindqvist et al. |
| 4,800,123 A | 1/1989 | Boeckeler |
| 4,801,667 A | 1/1989 | Brand |
| 4,803,254 A | 2/1989 | Dunks et al. |
| 4,808,652 A | 2/1989 | Gardner |
| 4,812,032 A | 3/1989 | Fukuda et al. |
| 4,812,598 A | 3/1989 | Chen |
| 4,816,584 A | 3/1989 | Kwak et al. |
| 4,820,747 A | 4/1989 | Chen |
| 4,822,864 A | 4/1989 | Chen |
| 4,829,136 A | 5/1989 | Oates |
| 4,836,960 A | 6/1989 | Spector et al. |
| 4,837,289 A | 6/1989 | Mueller et al. |
| 4,839,109 A | 6/1989 | Kaetsu et al. |
| 4,842,782 A | 6/1989 | Portney et al. |
| 4,846,913 A | 7/1989 | Frieder et al. |
| 4,861,823 A | 8/1989 | Qureshi |
| 4,871,821 A | 10/1989 | Stenzenberger et al. |
| 4,873,029 A | 10/1989 | Blum |
| 4,874,561 A | 10/1989 | Spector |
| 4,874,828 A | 10/1989 | Lukacs |
| 4,879,318 A | 11/1989 | Lipscomb et al. |
| 4,880,667 A | 11/1989 | Welch |
| 4,892,403 A | 1/1990 | Merle |
| 4,895,102 A | 1/1990 | Kachel et al. |

| WO | WO 89/11672 | 11/1989 |
| WO | WO89/11966 | 12/1989 |
| WO | 90/13413 | 11/1990 |
| WO | WO 92/12851 | 8/1992 |

OTHER PUBLICATIONS

Chapter 10. Diallyl Carbonates, pp. 301–325 (No date).

A Comparison of Photoinitator Efficiency in the Polymerization of Diethylene Glycol bis(Allyl Carbonate) by Lipscomb et al. (No date).

Dissertation Submitted to the Faculty of the Graduate School of The University of Louisville in Partial Fulfillment of the Requirements for the Degree of Doctor of Philosophy entitled "UV–Photoinitated Polymerization of Styrene and Diethylene Glycol Bis(Allyl Carbonate) by Aromatic Carbonyl Compounds" by Omar M. Buazza dated Dec. 1987.

Articles from Vision Monday dated Jan. 7, 1991 p. 20 entitled 25–Minute Lens–Molding System Bows; and 20/20 dated Feb. 1991 p. 18 entitled "25–Minute Lens–Molding System Debuts".

Article from *Vision Monday* dated Oct. 22, 1990 entitled "Vision Sciences Re–Casts Service Image".

Article from *Eyecare Business* dated Nov. 1990, pp. 28–30, entitled "Liquid Gold or Snake Oil?".

Patent Abstracts of Japan, vol. M–700, 12171, May 21, 1988.

Patent Abstracts of Japan, PN JP3184001, Aug. 12, 1991.

Patent Abstracts of Japan Patent No. 63227603, published Sep. 21, 1988.

Abstract No. J03116003 (No date).

JP Abstract 58042436 to Matsushita Denki Sangyo (Patent Abstracts of Japan), vol. 7, No. 124 (M218) May 28, 1983).

Ceska, Gary W., Materials from Presentation on "Sartomer Company: Raw Materials—UV–EB Cure; Monomers/Oligomers; Photoinitiators".

Coburn Optical Industries, Inc., Operating Manual for "Coburn/LTI Coating System—Clean'n'Coat ™ Unit".

Patent Abstracts of Derwent, Acc. No. 91–189128, for Japanese Patent No. 3116003.

Patent Abstracts of U.S. Patents 1950–Jun. 30, 1992.

Patent Abstracts of Japan, Appl. No. 88–310754, Mar. 17, 1987.

Roffey, C.G., "Photopolymerization of Surface Coatings," John Wiley & Sons, Jun. 1982, p. 163.

Rush, David, Memorandum entitled "Coburn/LTI Clean'N'Coat System Update," Coburn Optical Industries, Inc., Tulsa, OK, Nov. 7, 1990.

Sartomer Company, Brochure entitled "Sartomer; Monomer/Oligomer, Photoinitiator Product Line," Exton, PA, 1991.

Tenser, James, "25–Minute Lens–Molding System Bows," *Vision Monday* Feb. 1991.

Tenser, James, "25–Minute Lens–Molding System Debuts," *Vision Monday* Feb. 1991, p. 18.

UVEXS Incorporated, "Optical Lens Coating and Ultraviolet Curing System; Model 912; Specification UVC 91–181" UVEXS Incorporated, Sunnyvale, CA, Dec. 6, 1991.

UVEXS Incorporated, "UVEXS OM/92–02; Operating Manual for Optical Lens Coating and UV Curing System; Model 912" UVEXS Incorporated, Sunnyvale, CA, Jan. 1992.

\* cited by examiner

APPARATUS FOR THE PRODUCTION OF PLASTIC LENSES

CROSS-REFERENCE TO RELATED PATENT APPLICATIONS

This application is a divisional of application Ser. No. 07/800,561 filed Dec. 6, 1991, now U.S. Pat. No. 5,415,816, which is a continuation-in-part of Ser. No. 07/642,614 filed Jan. 17, 1991 and now abandoned, which is a continuation-in-part of Ser. No. 07/425,371 filed Oct. 26, 1989, now U.S. Pat. No. 6,201,037, which is a continuation-in-part of Ser. No. 07/273,428 filed Nov. 18, 1988, now U.S. Pat. No. 4,879,318, which is a continuation-in-part of Ser. No. 07/021,913 filed Mar. 4, 1987, now abandoned, which is a continuation-in-part of Ser. No. 06/823,339, filed Jan. 28, 1986, now U.S. Pat. No. 4,728,469.

BACKGROUND OF THE INVENTION

The present invention relates generally to methods, apparatus and compositions for making plastic lenses.

It is conventional in the art to produce optical lenses by thermal curing techniques from the polymer of diethylene glycol bis(allyl)-carbonate (DEG-BAC).

The polymer of DEG-BAC exhibits desirable optical and mechanical properties. These properties include high light transmission, high clarity, and high index of refraction together with high abrasion and impact resistance. The properties in the past made DEG-BAC one of the leading monomers in the manufacture of high quality lenses, face shields, sun and safety glasses. Other properties of DEG-BAC, however, such as its slow rate of polymerization, make it an undesirable monomer in the manufacture of these items. Moreover, DEG-BAC, without any additives or co-monomers, produces a hard but somewhat brittle polymer that is very prone to cracking. In addition, DEG-BAC, without additives, tends to adhere tightly to the lens forming molds, often leading to cracking of the molds.

In addition, the thermal curing techniques for polymerizing DEG-BAC to produce optical lenses have several disadvantages and drawbacks. One of the most significant drawbacks is that it may take approximately 12 hours to produce a lens according to thermal curing techniques. A lens forming mold, therefore, can produce at most two lenses per day.

Moreover, thermal curing techniques employ a thermal catalyst so that a polymerizable mixture of DEG-BAC and catalyst will slowly polymerize even while refrigerated. The polymerizable mixture therefore has a very short shelf life and must be used within a short time or it will harden in its container.

Furthermore, the thermal catalysts utilized according to the thermal curing techniques are quite volatile and dangerous to work with, thus requiring extreme care in handling.

Curing of a lens by ultraviolet light presents certain problems that must be overcome to produce a viable lens. Such problems include yellowing of the lens, cracking of the lens or mold, optical distortions in the lens, and premature release of the lens from the mold.

The present invention is directed to methods, apparatus and compositions for making plastic lenses that overcome the disadvantages and drawbacks of the prior art.

SUMMARY OF THE INVENTION

The present invention provides methods, apparatus and compositions for making plastic lenses, such as optical lenses for use in eyeglasses and the like.

In one embodiment of the present invention, a method for making plastic lenses is provided in which a polymerizable lens forming material is disposed in a mold cavity defined in part between a first mold member and a second mold member spaced apart from each other by a gasket. Rays of ultraviolet light are directed against either or both of the first and second mold members or the gasket. In a preferred embodiment, the first and second mold members are cooled. In another preferred embodiment, the ultraviolet light is filtered before it impinges on either or both of the first and second mold members.

In another embodiment of the present invention, an apparatus is provided for making plastic lenses which includes a first mold member and a second mold member spaced apart by a gasket, wherein the first and second mold members define a mold cavity. The apparatus includes a generator for generating and directing ultraviolet light against at least one of the first and second mold members. Alternatively, the apparatus includes a generator for generating and directing ultraviolet light against the gasket. The apparatus may also include a means for preventing the transmission of ultraviolet light through the first and second mold members. In addition, the apparatus may include a filter for filtering the ultraviolet light. The filter may be disposed between the generator for generating and directing ultraviolet light and the first mold member, and between the generator for generating and directing ultraviolet light and the second mold member. The apparatus may include a fluid (e.g. air) distributor or a liquid bath for cooling the first and second mold members.

In another embodiment of the invention, the lens forming material may be cooled at relatively low temperatures while being exposed to ultraviolet ("UV") light. The lens forming material may be cooled by directing various flowrates of cooling air towards the mold members. The mold members themselves may be made thinner or thicker to achieve optimum lens curing results. Different lens curvatures may be made from the same mold members by varying the UV intensity patterns on the mold members during cure of the lens forming material. Hardness, cure and rigidity of the lenses made as described above may be improved by demolding the lenses and then subjecting the lenses to high intensity UV light and/or heating.

In still another embodiment of the present invention, a photoinitiator is provided which includes methyl benzoyl-formate. The photoinitiator may be used with a composition that includes at least one polyethylenic-functional monomer containing two ethylenically unsaturated groups selected from acrylyl and methacrylyl. The photoinitiator may be used with a composition that includes at least one polyethylenic-functional monomer containing three ethylenically unsaturated groups selected from acrylyl and methacrylyl. The compositions may include an aromatic containing bis(allyl carbonate)-functional monomer such as bisphenol A bis(allyl carbonate). The compositions may include 1,6 hexanediol dimethacrylate, trimethylolpropane triacrylate, tetraethylene glycol diacrylate and/or tripropylene glycol diacrylate. In a preferred embodiment, the composition photoinitiator also includes 1-hydroxycyclohexyl phenyl ketone.

BRIEF DESCRIPTION OF THE DRAWINGS

The above brief description as well as further objects, features and advantages of the methods, apparatus and compositions of the present invention will be more fully appreciated by reference to the following detailed description of presently preferred but nonetheless illustrative embodiments in accordance with the present invention when taken in conjunction with the accompanying drawings in which.

DESCRIPTION OF THE PREFERRED EMBODIMENTS

Figure 1:
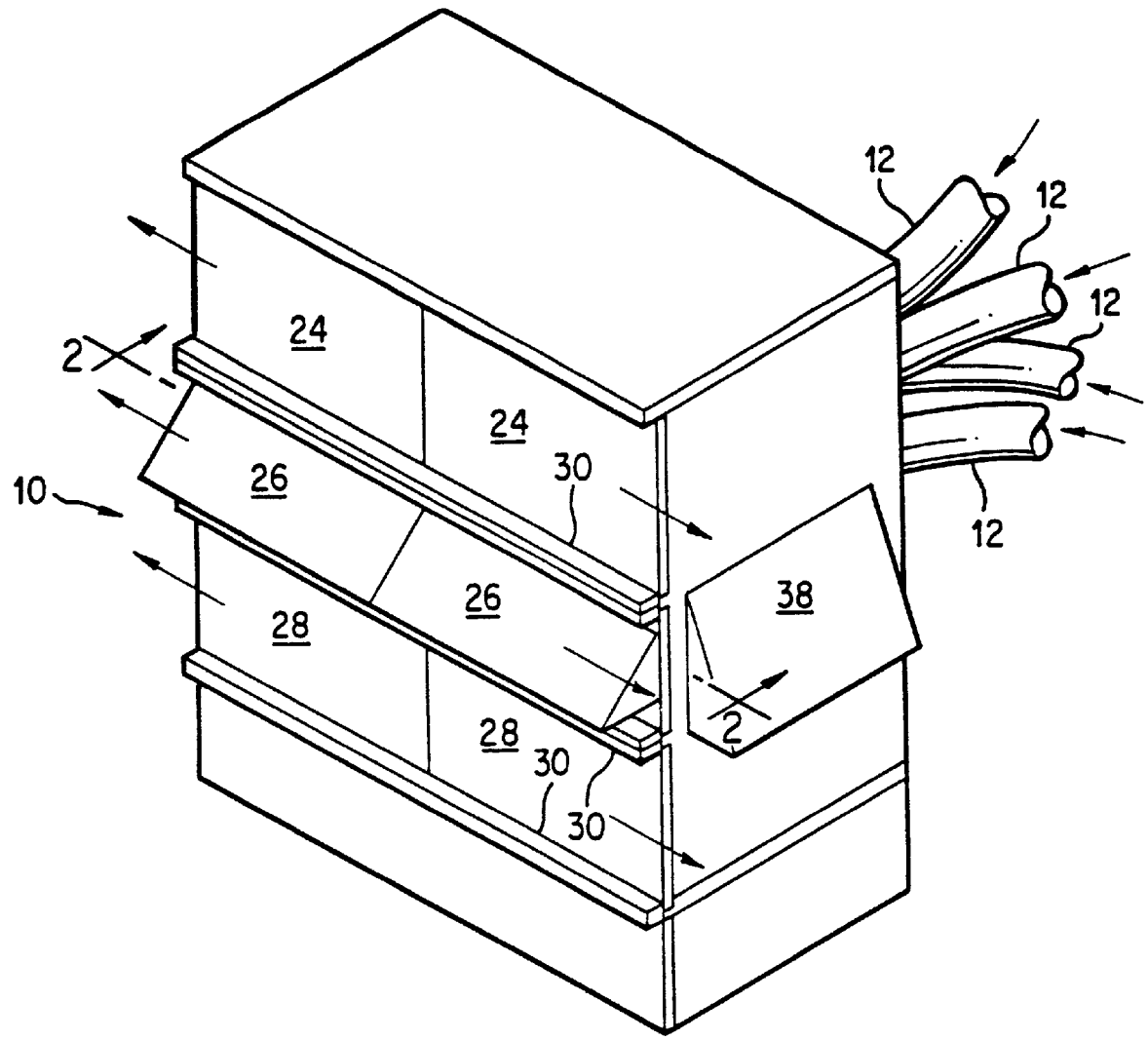
FIG. 1 is a perspective view of an apparatus for producing a plastic lens according to the present invention.

While various aspects of the present invention are hereinafter illustrated and described as being particularly adapted for the production of a plastic lens for use in eyeglasses, it is to be understood that lenses for other uses can also be produced, such as safety glasses as well as lenses having high quality optical use for instrument sightings, photography and light filtration.

Therefore, the present invention is not to be limited only to the embodiments illustrated in the drawings, because the drawings are merely illustrative of the wide variety of specific embodiments of the present invention.

Referring now to FIG. 1, a plastic lens curing chamber of the present invention is generally indicated by the reference numeral 10. The lens curing chamber 10 communicates through a plurality of pipes 12 with an air source (not shown), the purpose of which will be discussed below.

Figure 2:
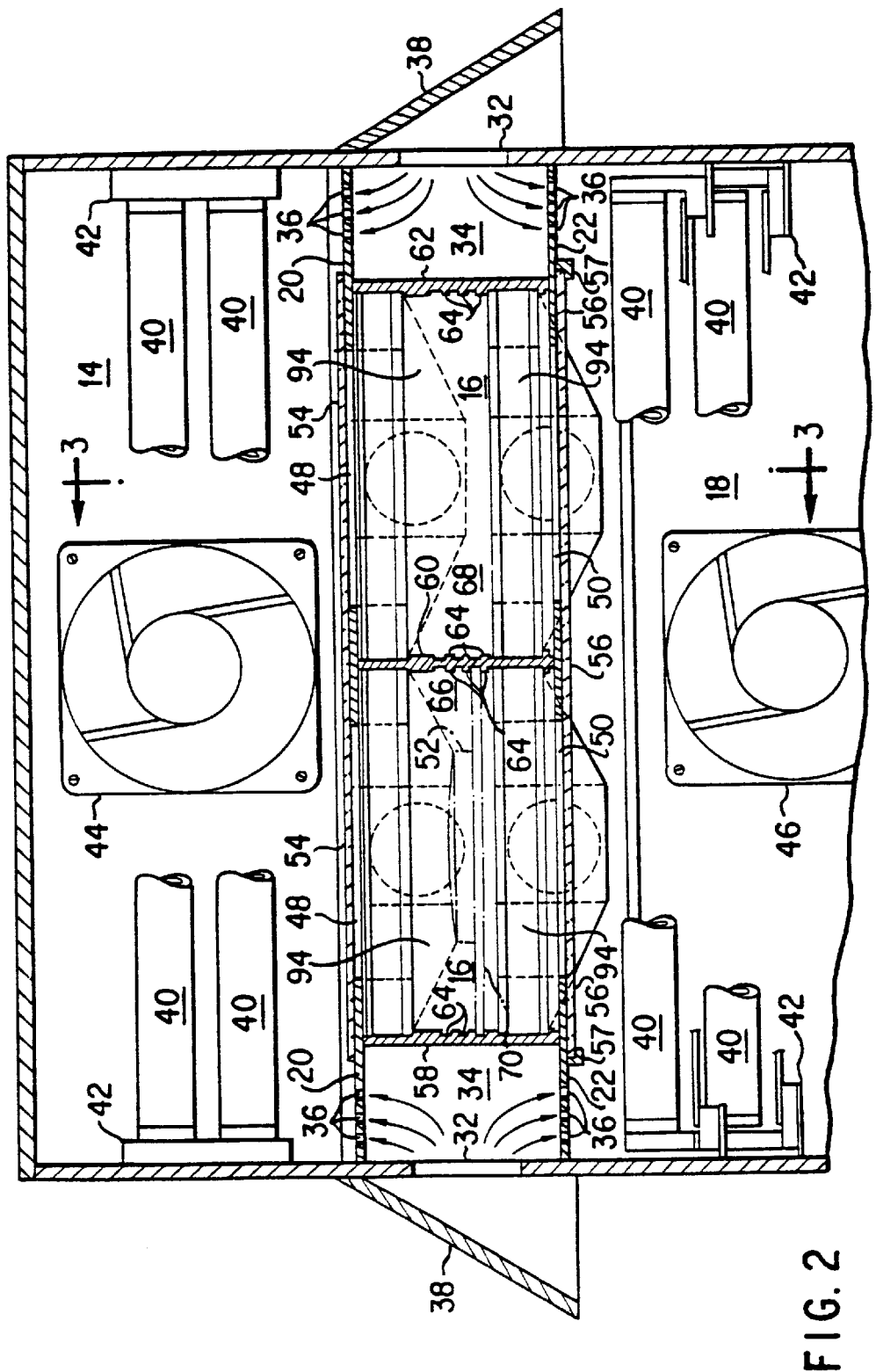
FIG. 2 is a cross-sectional view of the apparatus of the present invention taken along line 2—2 of FIG. 1.

As shown in FIG. 2, the plastic lens curing chamber 10 may include an upper lamp chamber 14, an irradiation chamber 16, and a lower lamp chamber 18. The upper lamp chamber 14 may be separated from the irradiation chamber 16 by a plate 20. The lower lamp chamber may be separated from the irradiation chamber 16 by a plate 22. The upper lamp chamber 14, the irradiation chamber 16, and the lower lamp chamber 18 may be isolated from ambient air by means of upper lamp chamber doors 24, irradiation chamber doors 26, and lower lamp chamber doors 28, respectively. While the upper lamp chamber doors 24, the irradiation chamber doors 26 and the lower lamp chamber doors 28 are shown in FIG. 1 as including two corresponding door members, those of ordinary skill in the art will recognize that the doors 24, 26 and 28 may comprise a single door member. The upper lamp chamber doors 24, the irradiation chamber doors 26 and the lower lamp chamber doors 28 may be slidingly mounted in guides 30. As shown in FIG. 2, vents 32 may communicate with upper lamp chamber 14 and lower lamp chamber 18 by way of corresponding vent chambers 34 and openings 36 disposed in plate 20 and plate 22. Each vent 32 may be shielded by a vent cover 38.

Figure 3:
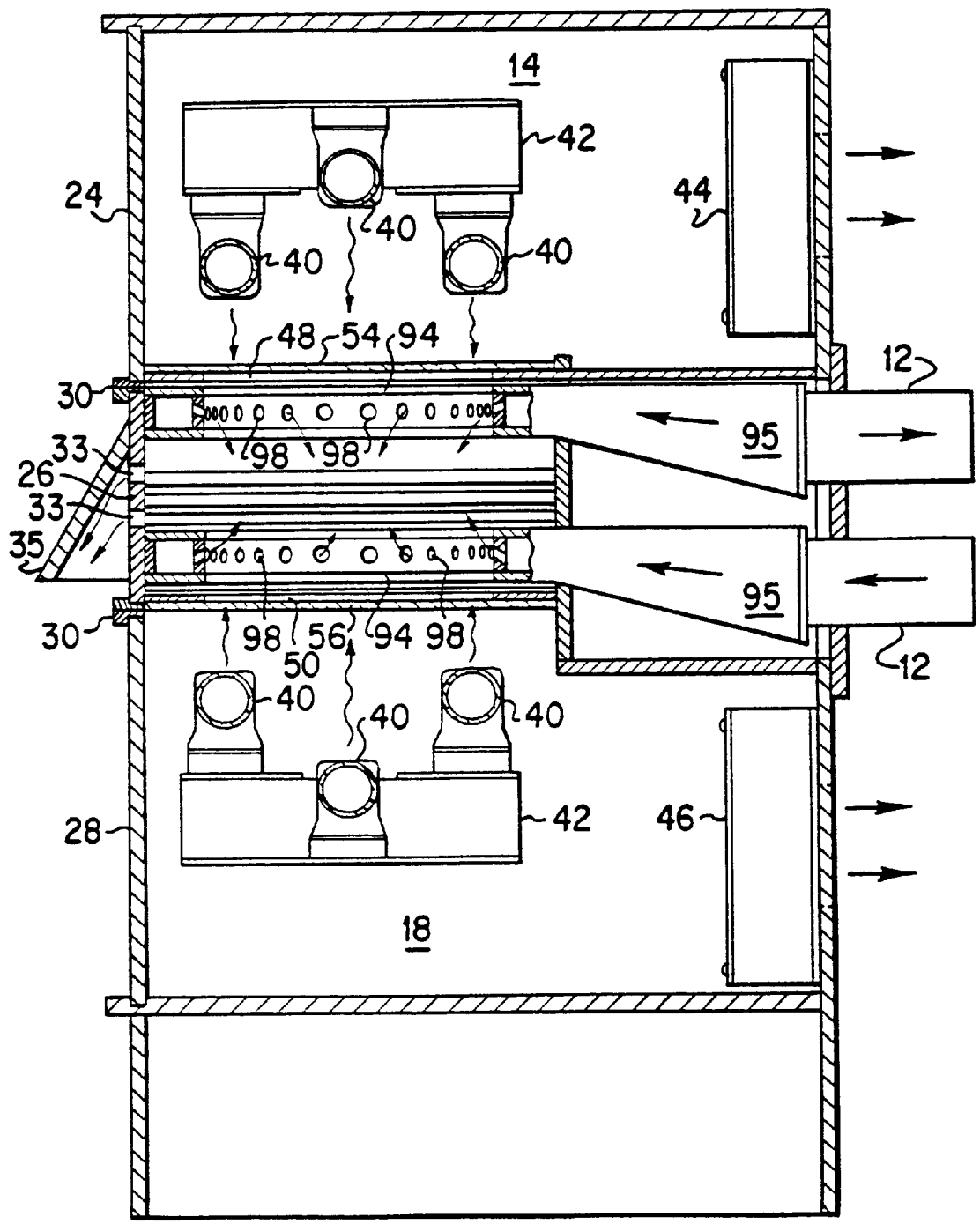
FIG. 3 is a cross-sectional view of the apparatus of the present invention taken along line 3—3 of FIG. 2.

As shown in FIG. 3, vents 33 may be disposed in the irradiation chamber doors 26 and communicate with irradiation chamber 16. Each vent 33 may be shielded by a vent cover 35.

As shown in FIGS. 2 and 3, a plurality of light generating devices or lamps 40 may be disposed within each of upper lamp chamber 14 and lower lamp chamber 18. Preferably, upper lamp chamber 14 and lower lamp chamber 18 each include three lamps 40 that are arranged in a triangular fashion in which the lamps 40 in the upper lamp chamber 14 are disposed with the point of the triangle pointing upwards whereas the lamps 40 in the lower lamp chamber 18 are disposed with the point of the triangle pointing downward. The lamps 40, preferably, generate ultraviolet light having a wavelength in the range of approximately 300 nm to 400 nm since the effective wavelength spectrum for curing the lens forming material lies in the 300 nm to 400 nm region. The lamps 40 may be supported by and electrically connected to suitable fixtures 42.

An exhaust fan 44 may communicate with upper lamp chamber 14 while an exhaust fan 46 may communicate with lower lamp chamber 18.

As noted above, the upper lamp chamber 14 may be separated from the irradiation chamber 16 by plate 20. Similarly, lower lamp chamber 18 may be separated from the irradiation chamber 16 by plate 22. The plates 20 and 22 may include apertures 48 and 50, respectively through which the light generated by lamps 40 may be directed so as to impinge upon a lens cell 52 (shown in phantom in FIG. 2). The diameter of the lens cell 52 according to the present invention, preferably, is approximately 74 mm. The apertures 48 and 50 preferably range from about 70 mm to about 140 mm. An upper light filter 54 rests upon plate 20 while a lower light filter 56 rests upon plate 22 or is supported by brackets 57. The upper light filter 54 and lower light filter 56 are shown in FIG. 2 as being comprised of a single filter member, however, those of ordinary skill in the art will recognize that each of the upper light filter 54 and lower light filter 56 may be comprised of two filter members. The components of upper light filter 54 and lower light filter 56 preferably are modified depending upon the characteristics of the lens to be molded. For instance, in a preferred embodiment for making negative lenses, the upper light filter 54 includes a plate of Pyrex glass that is frosted on both sides resting upon a plate of clear Pyrex glass. The lower light filter 56 includes a plate of Pyrex glass frosted on one side resting upon a plate of clear Pyrex glass with a device for reducing the intensity of ultraviolet light incident upon the center portion in relation to the edge portion of the lens being disposed between the plate of frosted Pyrex and the plate of clear Pyrex glass.

Conversely, in a preferred arrangement for producing positive lenses, the upper light filter 54 includes a plate of Pyrex glass frosted on one or both sides and a plate of clear Pyrex glass resting upon the plate of frosted Pyrex glass with a device for reducing the intensity of ultraviolet light incident upon the edge portion in relation to the center portion of the lens being disposed between the plate of clear Pyrex glass and the plate of frosted Pyrex glass. The lower light filter 56 includes a plate of clear Pyrex glass frosted on one side resting upon a plate of clear Pyrex glass with a device for reducing the intensity of ultraviolet light incident upon the edge portion in relation to the center portion of the lens being disposed between the plates of clear Pyrex glass. In this arrangement, in place of a device for reducing the relative intensity of ultraviolet light incident upon the edge portion of the lens, the diameter of the aperture 50 can be reduced to achieve the same result, i.e. to reduce the relative intensity of ultraviolet light incident upon the edge portion of the lens.

It will be apparent to those skilled in the art that each filter 54 or 56 could comprise a plurality of filter members or comprise any other means or device effective to reduce the light to its desired intensity, to diffuse the light and/or to create a light intensity gradient across the lens cell 52.

Preferably, the upper light filter 54 or the lower light filter 56 each comprise at least one plate of Pyrex glass having at least one frosted surface. Also, either or both of the upper light filter 54 and the lower light filter 56 may include more than one plate of Pyrex glass each frosted on one or both surfaces, and/or one or more sheets of tracing paper. After passing through frosted Pyrex glass, the ultraviolet light is believed to have no sharp intensity discontinuities which is believed to lead to a reduction in optical distortions in the finished lens. Those of ordinary skill in the art will recognize that other means may be used to diffuse the ultraviolet light so that it has no sharp intensity discontinuities.

Figure 4:
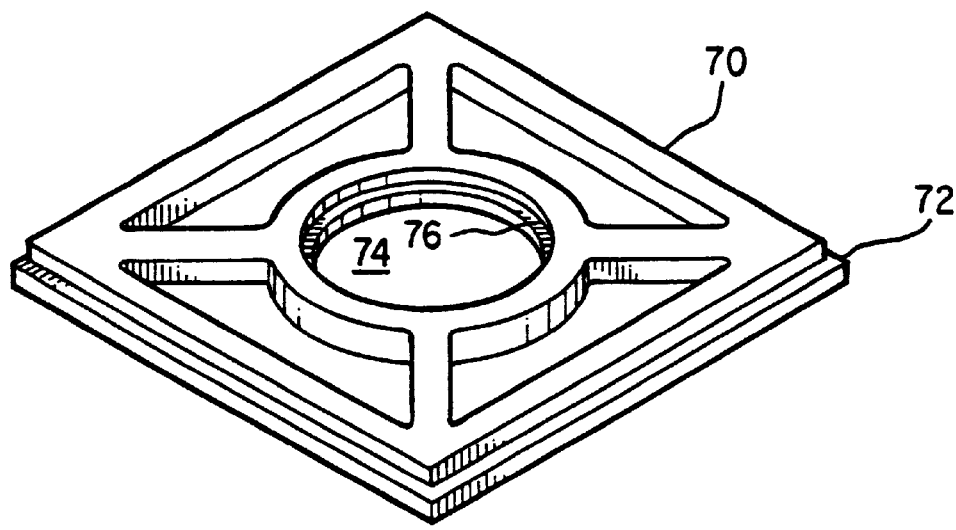
FIG. 4 is a detail view of a component of the apparatus of the present invention.

Disposed within the irradiation chamber 16 are a left stage 58, a center stage 60, and a right stage 62, each of which includes a plurality of steps 64. The left stage 58 and center stage 60 define a left irradiation chamber 66 while the right stage 62 and center stage 60 define a right irradiation chamber 68. A cell holder 70, shown in phantom in FIG. 2 and in detail in FIG. 4, may be disposed within each of left irradiation chamber 66 and right irradiation chamber 68. The cell holder 70 includes a peripheral step 72 that is designed to allow a cell holder 70 to be supported upon complementary steps 64 of left stage 58 and center stage 60, and center stage 60 and right stage 62, respectively. As shown in FIG. 4, each cell holder 70 also includes a central bore 74 to allow the passage therethrough of ultraviolet light from the lamps 40 and an annular step 76 which is designed to support a lens cell 52 in a manner described below.

Figure 6:
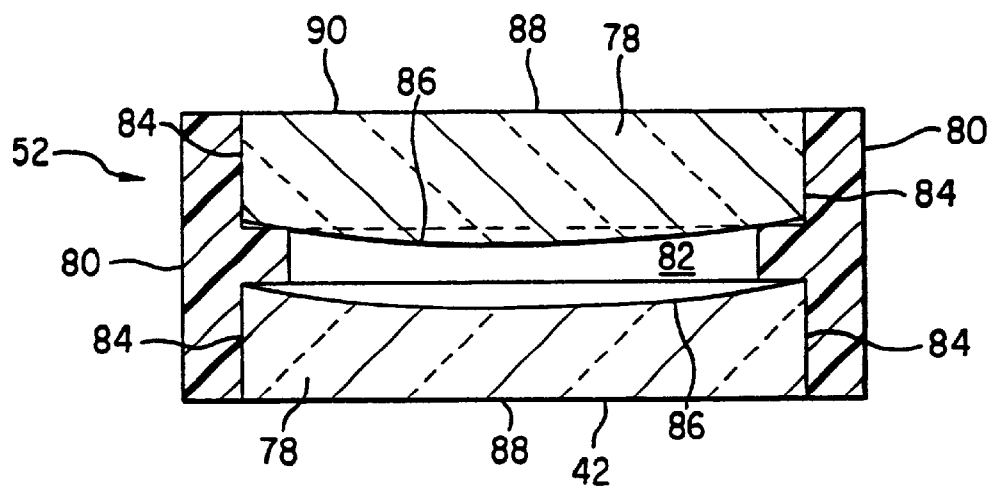
FIG. 6 is a cross-sectional view of a lens cell for use in the apparatus of the present invention.

As shown in FIG. 6, each lens cell 52 includes opposed mold members 78, separated by an annular gasket 80 to define a lens molding cavity 82. The opposed mold members 78 and the annular gasket 80 may be selected in a manner to produce a lens having a desired diopter.

The mold members 78, preferably, are formed of any suitable material that will permit rays of ultraviolet light to pass therethrough. The mold members 78, preferably, are formed of glass. Each mold member 78 has an outer peripheral surface 84 and a pair of opposed surfaces 86 and 88 with the surfaces 86 and 88 being precision ground. Preferably the mold members 78 have desirable ultraviolet light transmission characteristics and both the casting surface 86 and non-casting surface 88 preferably have no surface aberrations, waves, scratches or other defects as these may be reproduced in the finished lens.

As noted above, the mold members 78 are adapted to be held in spaced apart relation to define a lens molding cavity 82 between the facing surfaces 86 thereof. The mold members 78 are held in a spaced apart relation by a T-shaped flexible annular gasket 80 that seals the lens molding cavity 82 from the exterior of the mold members 78. In use, the gasket 80 is supported on the annular step 76 of the cell holder 70.

In this manner, in the embodiment of the present invention that is illustrated in FIG. 6 the upper or back mold member 90 has a convex inner surface 86 while the lower or front mold member 92 has a concave inner surface 86 so that the resulting lens molding cavity 82 is shaped to form a lens with a desired configuration. Thus, by selecting the mold members 78 with a desired surface 86, lenses with different characteristics, such as focal lengths, may be made by the apparatus 10. Such techniques are well known to those skilled in the art, and will therefore not be further discussed.

Rays of ultraviolet light emanating from lamps 40 pass through the mold members 78 and act on a lens forming material disposed in the mold cavity 82 in a manner discussed below so as to form a lens. As noted above, the rays of ultraviolet light pass through a suitable filter 54 or 56 to impinge upon the lens cell 52.

The mold members 78, preferably, are formed from a material that will not allow ultraviolet radiation having a wavelength below approximately 300 nm to pass therethrough. Suitable materials are Schott Crown, S-1 or S-3 glass manufactured and sold by Schott Optical Glass Inc., of Duryea, Pa. or Corning 8092 glass sold by Corning Glass of Corning, N.Y.

The annular gasket 80 may be formed of vinyl material that exhibits good lip finish and maintains sufficient flexibility at conditions throughout the lens curing process. In a preferred embodiment, the annular gasket 80 is formed of silicone rubber material such as GE SE6035 which is commercially available from General Electric. In another preferred embodiment, the annular gasket 80 is formed of copolymers of ethylene and vinyl acetate which are commercially available from E. I. DuPont de Nemours & Co. under the trade name ELVAX®. Preferred ELVAX® resins are ELVAX® 350 having a melt index of 17.3–20.9 dg/min and a vinyl acetate content of 24.3–25.7 wt. %, ELVAX® 250 having a melt index of 22.0–28.0 dg/min and a vinyl acetate content of 27.2–28.8 wt. %, ELVAX® 240 having a melt index of 38.0–48.0 dg/min and a vinyl acetate content of 27.2–28.8 wt. %, and ELVAX® 150 having a melt index of 38.0–48.0 dg/min and a vinyl acetate content of 32.0–34.0 wt. %. Regardless of the particular material, the gaskets 80 may be prepared by conventional injection molding or compression molding techniques which are well-known by those of ordinary skill in the art.

Figure 5:
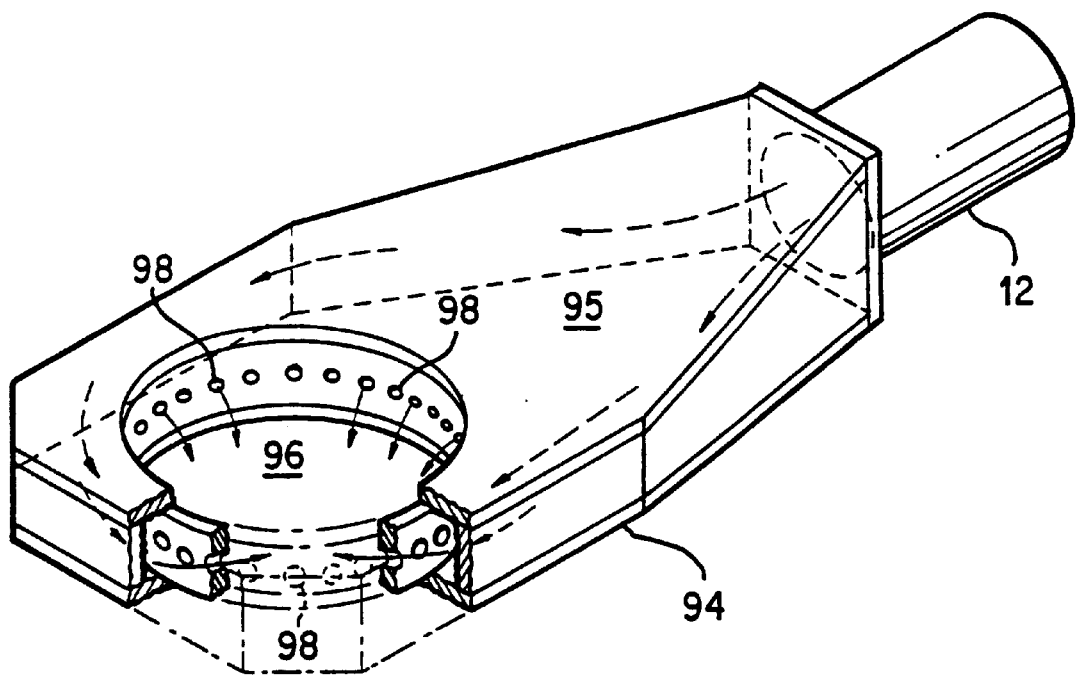
FIG. 5 is a detail view of a component of the apparatus of the present invention.

As shown in phantom in FIG. 2, in section in FIG. 3, and in detail in FIG. 5, an upper and lower air distribution device 94 is disposed in each of left irradiation chamber 66 and right irradiation chamber 68. Each air distribution device 94 is connected to a pipe 12. As shown in FIG. 5, each air distribution device 94 includes a plenum portion 95 and a cylindrical opening 96 having orifices 98 disposed therein to allow for the expulsion of air from the air distribution device 94. The diameter of the orifices 98 varies around the circumference of cylindrical opening 96 preferably reaching a maximum when directly opposite the plenum portion 95 of air distribution device 94 and preferably reaching a minimum immediately adjacent the plenum portion 95. In addition, the orifices 98 are designed to blow air toward a lens cell 52 that may be disposed in a lens cell holder 70 and installed in left irradiation chamber 66 or right irradiation chamber 68.

In operation, the apparatus of the present invention may be appropriately configured for the production of positive lenses which are relatively thick at the center or negative lenses which are relatively thick at the edge. To reduce the likelihood of premature release, the relatively thick portions of a lens preferably are polymerized at a faster rate than the relatively thin portions of a lens.

The rate of polymerization taking place at various portions of a lens may be controlled by varying the relative intensity of ultraviolet light incident upon particular portions of a lens. The rate of polymerization taking place at various portions of a lens may also be controlled by directing air across the mold members 78 to cool the lens cell 52.

For positive lenses the intensity of incident ultraviolet light, preferably, is reduced at the edge portion of the lens so that the thicker center portion of the lens polymerizes faster than the thinner edge portion of the lens. Conversely, for a negative lens, the intensity of incident ultraviolet light, preferably, is reduced at the center portion of the lens so that the thicker edge portion of the lens polymerizes faster than the thinner center portion of the lens. For either a positive lens or a negative lens, air may be directed across the faces of the mold members 78 to cool the lens cell 52. As the overall intensity of incident ultraviolet light is increased, more cooling is needed which can be accomplished by either or both of increasing the velocity of the air and reducing the temperature of the air.

It is well known by those of ordinary skill in the art that lens forming materials having utility in the present invention tend to shrink as they cure. If the relatively thin portion of a lens is allowed to polymerize before the relatively thick portion, the relatively thin portion will tend to be rigid at the time the relatively thick portion cures and shrinks and the lens will either release prematurely from or crack the mold members 78. Accordingly, when the relative intensity of ultraviolet light incident upon the edge portion of a positive lens is reduced relative to the center portion, the center portion polymerizes faster and shrinks before the edge portion is rigid so that the shrinkage is more uniform. Conversely, when the relative intensity of ultraviolet light incident upon the center portion of a negative lens is reduced relative to the edge portion, the edge portion polymerizes faster and shrinks before the center becomes rigid so that the shrinkage is more uniform.

According to the present invention, the variation of the relative intensity of ultraviolet light incident upon a lens may be accomplished in a variety of ways. According to one method, in the case of a positive lens, a ring of opaque material may be placed between the lamps 40 and the lens cell 52 so that the incident ultraviolet light falls mainly on the thicker center portion of the lens. Conversely, for a negative lens, a disk of opaque material may be placed between the lamps 40 and the lens cell 52 so that the incident ultraviolet light falls mainly on the edge portion of the lens.

According to another method, in the case of a negative lens, a sheet material having a variable degree of opacity ranging from opaque at a central portion to transparent at a radial outer portion is disposed between the lamps 40 and the lens cell 52. Conversely, for a positive lens, a sheet material having a variable degree of opacity ranging from transparent at a central portion to opaque at a radial outer portion is disposed between the lamps 40 and the lens cell 52.

According to still another method, a plurality of ultraviolet-light absorbing geometric or random shapes are printed and arranged on a sheet material. In the case of a positive lens, the density of the shapes is greatest at a radial outer portion while the density of the shapes is smallest at a central portion of the pattern. Conversely, in the case of a negative lens, the density of the shapes is smallest at a radial outer portion while the density of the shapes is greatest at a central portion of the pattern.

Those of ordinary skill in the art will recognize that there are a wide variety of techniques other than those enumerated above for varying the intensity of the ultraviolet light incident upon the opposed mold members 78.

The intensity of the incident light has been measured and determined to be approximately 3.0 to 5.0 milliwatts per square centimeter ($mW/cm^2$) prior to passing through either the upper light filter 54 or the lower light filter 56 and the total intensity at the thickest part of the lens ranges from 0.6 to 2.0 $mW/cm^2$ while the intensity at the thinnest portion of the lens ranges from 0.1 to 1.5 $mW/cm^2$. It has also been determined that the overall light intensity incident on the lens cell 52 has less of an impact on the final product than the relative light intensity incident upon the thick or thin portions of the lens so long as the lens cell 52 is sufficiently cooled to reduce the polymerization rate to an acceptable level.

According to the present invention, it has been determined that the finished power of an ultraviolet light polymerized lens may be controlled by manipulating the distribution of the incident ultraviolet light striking the opposed mold members 78. For instance, for an identical combination of mold members 78 and gasket 80, the focusing power of the produced lens may be increased or decreased by changing the pattern of intensity of ultraviolet light across the lens mold cavity 82 or the faces of the opposed mold members 78.

As the lens forming material begins to cure, it passes through a gel state, the pattern of which within the lens cell 52 leads to the proper distribution of internal stresses generated later in the cure when the lens forming material begins to shrink.

As the lens forming material shrinks during the cure, the opposed mold members 78 will flex as a result of the different amounts of shrinkage between the relatively thick and the relatively thin portions of the lens. When a negative lens, for example, is cured, the upper or back mold member 90 will flatten and the lower or front mold member 92 will steepen with most of the flexing occurring in the lower or front mold member 92. Conversely, with a positive lens, the upper or back mold member 90 will steepen and the lower or front mold member 92 will flatten with most of the flexing occurring in the upper or back mold member 90.

By varying the intensity of the ultraviolet light between the relatively thin and the relatively thick portions of the lens in the lens forming cavity 82, it is possible to create more or less total flexing. Those light conditions which result in less flexing will minimize the possibility of premature release.

The initial curvature of the opposed mold members 78 and the center thickness of the lens produced can be used to compute the theoretical or predicted power of the lens. The ultraviolet light conditions can be manipulated to alter the power of the lens to be more or less than predicted. For example, when a disk of opaque material is positioned between the lower lamp chamber 18 and the lens cell 52, less total flexure is observed. The greater the diameter of the disk of opaque material, the more negative (−) power the resultant lens will exhibit.

When the lenses cured by the ultraviolet light are removed from the opposed mold members 78, they are under a stressed condition. It has been determined that the power of the lens can be brought to a final resting power, by subjecting the lenses to a post-curing heat treatment to relieve the internal stresses developed during the cure and cause the curvature of the front and the back of the lens to shift. Typically, the lenses are cured by the ultraviolet light in about 10–30 minutes (preferably about 15 minutes). The post-curing heat treatment is conducted at approximately 85–120° C. for approximately 5–15 minutes. Preferably, the post-curing heat treatment is conducted at 100–110° C. for approximately 10 minutes. Prior to the post-cure, the lenses generally have a lower power than the final resting power. The post-curing heat treatment reduces yellowing of the lens and reduces stress in the lens to alter the power thereof to a final power. The post-curing heat treatment can be conducted in a conventional convection oven or any other suitable device.

According to the present invention, the ultraviolet lamps 40 preferably are maintained at a temperature at which the lamps 40 deliver maximum output. The lamps 40, preferably, are cooled because the intensity of the light produced by the lamps 40 fluctuates when the lamps 40 are allowed to overheat. In the apparatus of the present invention depicted in FIG. 2, the cooling of the lamps 40 is accomplished by sucking ambient air into the upper lamp chamber 14 and lower lamp chamber 18 through vent 32, vent chambers 34 and openings 36 by means of exhaust fans 44 and 46, respectively. Excessive cooling of the lamps 40 should be avoided, however, as the intensity of the light produced by the lamps 40 is reduced when the lamps 40 are cooled to an excessive degree.

Figure 9:
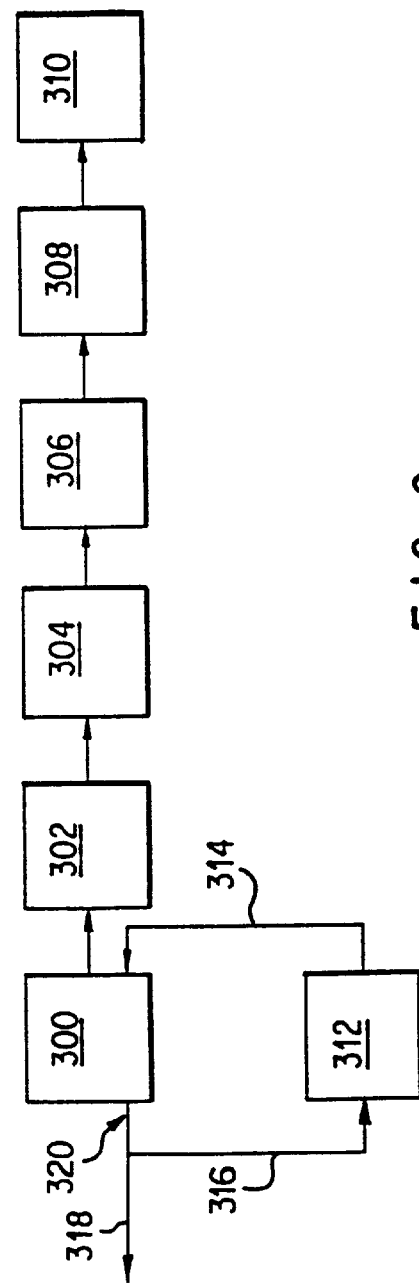
FIG. 9 is a schematic block diagram of an alternate process and system for making and postcuring a plastic lens.

As noted above, according to the present invention, the lens cell 52, preferably, is cooled during curing of the lens forming material as the overall intensity of the incident ultraviolet light is increased. Cooling of the lens cell 52 generally reduces the likelihood of premature release by slowing the reaction and improving adhesion. There are also improvements in the optical quality, stress characteristics and impact resistance of the lens. Cooling of the lens cell 52, preferably, is accomplished by blowing air across the lens cell 52. The air preferably has a temperature ranging between 15 and 85° F. (about −9.4° C. to 29.4° C.) to allow for a curing time of between 30 and 10 minutes. The air distribution devices 94 depicted in FIG. 5 have been found to be particularly advantageous as they are specifically designed to direct air directly across the surface of the opposed mold members 78. After passing across the surface of the opposed mold members 78, the air emanating from the air distribution devices 94 is vented through vents 33. Alternately the air emanating from the air distribution devices 94 may be recycled back to an air cooler 312, such as is shown in FIG. 9.

The lens cell 52 may also be cooled by disposing the lens cell in a liquid cooling bath.

The opposed mold members 78, preferably, are thoroughly cleaned between each curing run as any dirt or other impurity on the mold members 78 may cause premature release. The mold members 78 are cleaned by any conventional means well known to those of ordinary skill in the art such as with a domestic cleaning product i.e. Mr. Clean® available from Procter and Gamble. Those of ordinary skill in the art will recognize, however, that many other techniques may also be used for cleaning the mold members 78.

Yellowing of the finished lens may be related to the monomer composition, the identity of the photoinitiator and the concentration of the photoinitiator.

When casting a lens, particularly a positive lens that is thick in the center, cracking may be a problem. Addition polymerization reactions, including photochemical addition polymerization reactions, are exothermic. During the process, a large temperature gradient may build up and the resulting stress may cause the lens to crack.

When the polymerization reaction proceeds too rapidly, heat buildup inside the system which leads to cracking is inevitable. The likelihood of cracking increases as the temperature difference between the center of the lens forming material and room temperature increases. During the polymerization process, several forces tending to crack the lens, such as shrinkage, adhesion, and thermal gradients, are at work. Other forces tending to crack the lens may occur when the irradiation is stopped and the lens is cooled, especially if the lens cell 52 is allowed to cool too quickly.

The formation of optical distortions usually occurs during the early stages of the polymerization reaction during the transformation of the lens forming composition from the liquid to the gel state. Once patterns leading to optical distortions form they are difficult to eliminate. When gelation occurs there is a rapid temperature rise. The exothermic polymerization step causes a temperature increase, which in turn causes an increase in the rate of polymerization, which causes a further increase in temperature. If the heat exchange with the surroundings is not sufficient enough there will be a runaway situation that leads to premature release, the appearance of thermally caused striations and even breakage. Since the rate of polymerization increases rapidly at the gelation point, this is an important phase of the reaction.

Accordingly, it is preferred that the reaction process be smooth and not too fast but not too slow. Heat is preferably not generated by the process so fast that it cannot be exchanged with the surroundings. The incident ultraviolet light intensity preferably is adjusted to allow the reaction to proceed at a desired rate. It is also preferred that the seal between the annular gasket 80 and the opposed mold members 78 is as complete as possible.

Factors that have been found to lead to the production of lenses that are free from optical distortions are (1) achieving a good seal between the annular gasket 80 and the opposed mold members 78; (2) using mold members 78 having surfaces that are free from defects; (3) using a formulation having an appropriate type and concentration of photoinitiator that will produce a reasonable rate of temperature rise; and (4) using a homogeneous formulation. Preferably, these conditions are optimized.

Premature release of the lens from the mold will result in an incompletely cured lens and the production of lens defects. Factors that contribute to premature release are (1) a poorly assembled lens cell 52; (2) the presence of air bubbles around the sample edges; (3) imperfection in gasket lip or mold edge; (4) inappropriate formulation; (5) uncontrolled temperature rise; and (6) high or nonuniform shrinkage. Preferably, these conditions are minimized.

Premature release may also occur when the opposed mold members 78 are held too rigidly by the annular gasket 80. Preferably, there is sufficient flexibility in the annular gasket 80 to permit the opposed mold members 78 to follow the lens as it shrinks. Indeed, the lens must be allowed to shrink in diameter slightly as well as in thickness. The use of an annular gasket 80 that has a reduced degree of stickiness with the lens during and after curing is therefore desirable.

In a preferred technique for filling the lens molding cavity 82, the annular gasket 80 is placed on a concave or front mold member 92 and a convex or back mold member 90 is moved into place. The annular gasket 80 is then pulled away from the edge of the back mold member 90 at the uppermost point and a lens forming composition is injected into the lens molding cavity 82 until a small amount of the lens forming composition is forced out around the edge. The excess is then removed, preferably, by vacuum. Excess liquid that is not removed could spill over the face of the back mold member 90 and cause optical distortion in the finished lens.

Despite the above problems, the advantages offered by the radiation cured lens molding system clearly outweigh the disadvantages. The advantages of a radiation cured system include a significant reduction in energy requirements, curing time and other problems normally associated with conventional thermal systems.

According to the present invention, the lens forming material can comprise any suitable liquid monomer or monomer mixture and any suitable photosensitive initiator. The lens forming material, preferably, does not include any component, other than a photoinitiator, that absorbs ultraviolet light having a wavelength in the range of 300 to 400 nm. The liquid lens forming material, preferably, is filtered for quality control and placed in the lens molding cavity 82 by pulling the annular gasket 80 away from one of the opposed mold members 78 and injecting the liquid lens forming material into the lens molding cavity 82. Once the lens molding cavity 82 is filled with such material, the annular gasket 80 is replaced into its sealing relation with the opposed mold members 78. The material can then be irradiated with ultraviolet light in the manner described above for a time period that is necessary to cure the lens forming material, preferably approximately 10 to approximately 30 minutes. The ultraviolet light entering the lens molding cavity 82 preferably has a wavelength in the range of approximately 300 nm. to approximately 400 nm.

Those skilled in the art will recognize that once the cured lens is removed from the lens molding cavity 82 by disassembling the opposed mold members 78, the lens can be further processed in a conventional manner, such as by grinding its peripheral edge.

According to the present invention a polymerizable lens forming composition comprises an aromatic-containing bis (allyl carbonate)-functional monomer and at least one polyethylenic-functional monomer containing two ethylenically unsaturated groups selected from acrylyl and methacrylyl. In a preferred embodiment, the composition further comprises a suitable photoinitiator. In other preferred embodiments, the composition may include one or more polyethylenic-functional monomers containing three ethylenically unsaturated groups selected from acrylyl and methacrylyl, and a dye.

Aromatic-containing bis(allyl carbonate)-functional monomers which can be utilized in the practice of the present invention are bis(allyl carbonates) of dihydroxy aromatic-containing material. The dihydroxy aromatic-containing material from which the monomer is derived may be one or more dihydroxy aromatic-containing compounds. Preferably the hydroxyl groups are attached directly to nuclear aromatic carbon atoms of the dihydroxy aromatic-containing compounds. The monomers are themselves known and can be prepared by procedures well known in the art.

The aromatic-containing bis(allyl carbonate)-functional monomers can be represented by the formula:

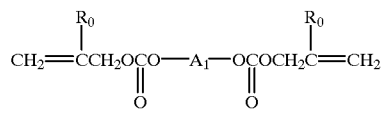

(I)

in which $A_1$ is the divalent radical derived from the dihydroxy aromatic-containing material and each $R_0$ is independently hydrogen, halo, or a $C_1$-$C_4$, alkyl group. The alkyl group is usually methyl or ethyl. Examples of $R_0$ include hydrogen, chloro, bromo, fluoro, methyl, ethyl, n-propyl, isopropyl and n-butyl. Most commonly $R_0$ is hydrogen or methyl; hydrogen is preferred. A subclass of the divalent radical $A_1$, which is of particular usefulness is represented by the formula:

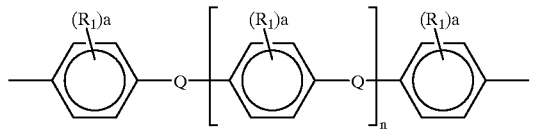

(II)

in which each $R_1$ is independently alkyl containing from 1 to about 4 carbon atoms, phenyl, or halo; the average value of each a is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3. Preferably Q is methylethylidene, viz., isopropylidene.

Preferably the value of n is zero, in which case $A_1$ is represented by the formula:

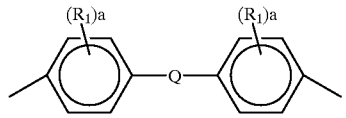

(III)

in which each $R_1$, each a, and Q are as discussed in respect of Formula II. Preferably the two free bonds are both in the ortho or para positions. The para positions are especially preferred.

The dihydroxy aromatic-containing compounds from which $A_1$ is derived may also be polyol-functional chain extended compounds. Examples of such compounds include alkaline oxide extended bisphenols. Typically the alkaline oxide employed is ethylene oxide, propylene oxide, or mixtures thereof. By way of exemplification, when para, para-bisphenols are chain extended with ethylene oxide, the bivalent radical $A_1$, may often be represented by the formula:

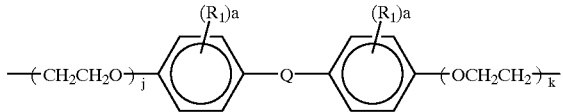

(IV)

where each $R_1$, each a, and Q are as discussed in respect of Formula II, and the average values of j and k are each independently in the range of from about 1 to about 4.

The preferred aromatic-containing bis(allyl carbonate)-functional monomer is represented by the formula:

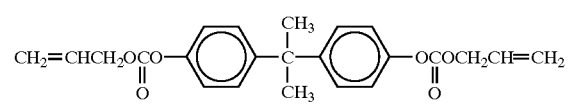

(V)

and is commonly known as bisphenol A bis(allyl carbonate).

A wide variety of compounds may be used as the polyethylenic functional monomer containing two or three ethylenically unsaturated groups. The preferred polyethylenic functional compounds containing two or three ethylenically unsaturated groups may be generally described as the acrylic acid esters and the methacrylic acid esters of aliphatic polyhydric alcohols, such as, for example, the di- and triacrylates and the di- and trimethacrylates of ethylene glycol, triethylene glycol, tetraethylene glycol, tetramethylene glycol, glycidyl, diethyleneglycol, butyleneglycol, propyleneglycol, pentanediol, hexanediol, trimethylolpropane, and tripropyleneglycol. Examples of specific suitable polyethylenic—functional monomers containing two or three ethylenically unsaturated groups include trimethylolpropanetriacrylate (TMPTA), tetraethylene glycol diacrylate (TTEGDA), tripropylene glycol diacrylate (TRPGDA), 1,6 hexanedioldimethacrylate (HDDMA), and hexanedioldiacrylate (HDDA).

In general, a photoinitiator for initiating the polymerization of the lens forming composition of the present invention, preferably, exhibits an ultraviolet absorption spectrum over the 300–400 nm range. High absorptivity of a photoinitiator in this range, however, is not desirable, especially when casting a thick lens. The following are examples of illustrative photoinitiator compounds within the scope of the invention: methyl benzoylformate, 2-hydroxy-2-methyl-1-phenylpropan-1-one, 1-hydroxycyclohexyl phenyl ketone, 2,2-di-sec- butoxyacetophenone, 2,2-diethoxyacetophenone, 2,2-diethoxy-2-phenyl-acetophenone, 2,2-dimethoxy-2- phenyl-acetophenone, benzoin methyl ether, benzoin isobutyl ether, benzoin, benzil, benzyl disulfide, 2,4-dihydroxybenzophenone, benzylideneacetophenone, benzophenone and acetophenone. Preferred photoinitiator compounds are 1-hydroxycyclohexyl phenyl ketone (which is commercially available from-Ciba-Geigy as Irgacure 184), methyl benzoylformate (which is commercially available from Polysciences, Inc.), or mixtures thereof.

Methyl benzoylformate is a generally preferred photoinitiator because it tends to provide a slower rate of polymerization. The slower rate of polymerization tends to prevent excessive heat buildup (and resultant cracking of the lens) during polymerization. In addition, it is relatively easy to six liquid methyl benzoylformate (which is liquid at ambient temperatures) with many acrylates, diacrylates, and allyl carbonate compounds to form a lens forming composition. The lenses produced with the methyl benzoylformate photoinitiator tend to exhibit more favorable stress patterns and uniformity.

A strongly absorbing photoinitiator will absorb most of the incident light in the first millimeter of lens thickness, causing rapid polymerization in that region. The remaining light will produce a much lower rate of polymerization below this depth and will result in a lens that has visible distortions. An ideal photoinitiator will exhibit high activity, but will have a lower extinction coefficient in the useful range. A lower extinction coefficient of photoinitiators at longer wavelengths tends to allow the ultraviolet radiation to penetrate deeper into the reaction system. This deeper penetration of the ultraviolet radiation allows photoinitiator radicals to form uniformly throughout the sample and provide excellent overall cure. Since the sample can be irradiated from both top and bottom, a system in which appreciable light reaches the center of the thickest portion of the lens is preferred. The photoinitiator solubility and compatibility with the monomer system is also an important requirement.

An additional consideration is the effect of the photoinitiator fragments in the finished polymer. Some photoinitiators generate fragments that impart a yellow color to the finished lens. Although such lenses actually absorb very little visible light, they are cosmetically undesirable.

Photoinitiators are often very system specific so that photoinitiators that are efficient in one system may function poorly in another. In addition, the initiator concentration to a large extent, is dependent on the incident light intensity and the monomer composition. The identity of the initiator and its concentration are important for any particular formulation. A concentration of initiator that is too high tends to lead to cracking and yellowing of the lens. Concentrations of initiator that are too low tend to lead to incomplete polymerization and a soft material.

Dyes and/or pigments are optional materials that may be present when high transmission of light is not necessary.

The listing of optional ingredients discussed above is by no means exhaustive. These and other ingredients may be employed in their customary amounts for their customary purposes so long as they do not seriously interfere with good polymer formulating practice.

According to a preferred embodiment of the present invention, the preferred aromatic-containing bis(allyl carbonate) functional monomer, bisphenol A bis(allyl carbonate) is admixed with one or more faster reacting polyethylenic functional monomers containing two acrylate or methacrylate groups such as 1,6 hexanediol dimethacrylate (HDDMA), 1,6 hexanediol diacrylate (HDDA), tetraethylene glycol diacrylate (TTEGDA), and tripropylene glycol diacrylate (TRPGDA) and optionally a polyethylenic functional monomer containing three acrylate groups such as trimethylolpropane triacrylate (TMPTA). Generally, compounds containing acrylate groups polymerize much faster than those containing allyl groups.

The lamps 40 generate an intensity at the lamp surface of approximately 4.0 to 7.0 mW/cm$^2$ of ultraviolet light having wavelengths between 300 and 400 nm, which light is very uniformly distributed without any sharp discontinuities throughout the reaction process. Such bulbs are commercially available from Sylvania under the trade designation Sylvania Fluorescent (F158T/2052) or Sylvania Fluorescent (F258T8/350BL/18") GTE. As noted above, ultraviolet light having wavelengths between 300 and 400 nm is preferred because the photoinitiators according to the present invention, preferably, absorb most efficiently at this wavelength and the mold members 78, preferably, allow maximum transmission at this wavelength.

It is preferred that there be no sharp intensity gradients of ultraviolet radiation either horizontally or vertically through the lens composition during the curing process. Sharp intensity gradients through the lens may lead to defects in the finished lens.

According to one embodiment of the present invention, the liquid lens forming composition includes bisphenol A bis(allyl carbonate) in place of DEG-BAC. The bisphenol A bis(allyl-carbonate) monomer has a higher refractive index than DEG-BAC which allows the production of thinner lenses which is important with relatively thick positive or negative lenses. The bisphenol A bis(allyl-carbonate) monomer is commercially available from PPG Industries under the trade name HIRI I or CR-73. Lenses made from this product sometimes have a very slight, barely detectable, degree of yellowing. A small amount of a blue dye consisting of 9, 10-anthracenedione, 1-hydroxy-4-[(4-methylphenyl)amino] available as Thermoplast Blue 684 from BASF Wyandotte Corp. is preferably added to the composition to counteract the yellowing. In addition, the yellowing tends to disappear if the lens is subjected to the above-described post-cure heat treatment. Moreover, if not post-cured the yellowing tends to disappear at ambient temperature after approximately 2 months.

According to a preferred embodiment, the composition of the present invention includes (a) bisphenol A-bis(allyl carbonate); (b) at least one of HDDMA, TTEGDA and TRPGDA; and (c) a photoinitiator. According to this embodiment the composition may also include one or both of TMPTA and a dye.

According to another preferred embodiment, the composition of the present invention includes (a) up to 70 percent by weight of bisphenol A bis(allyl carbonate); (b) up to 100 percent by weight of HDDMA; (c) up to 100 percent by weight of TTEGDA; (d) up to 100 percent by weight of TRPGDA; and (e) up to 100 percent by weight of TMPTA. Preferably, the composition further comprises (f) up to about 1.0 percent by weight of 1-hydroxycyclohexylphenyl ketone; and (g) up to about 1.2 percent by weight of methyl benzoylformate. Preferably the composition further comprises (h) up to about 1.0 parts per million (ppm) of 9,10-anthracenedione, 1-hydroxy-4-[(4-methylphenyl)amino].

According to still another preferred embodiment, the composition of the present invention includes (a) about 15.0 to about 25.0 percent by weight of bisphenol A bis(allyl-carbonate); (b) about 8 to about 14.0 percent by weight of HDDMA; (c) about 15.0 to about 25.0 percent by weight of TTEGDA; (d) about 17.0 to about 37.0 percent by weight of TRPCDA; and (e) about 15.0 to about 25.0 percent by weight of TMPTA. The composition may also include (f) about 0.003 to about 0.04 percent by weight of 1-hydroxycyclohexylphenyl ketone, (g) about 0.015 to about 0.05 percent by weight of methyl benzoylformate, and (h) about 0.16 to about 0.20 ppm of 9,10-anthracenedione, 1-hydroxy-4-[(4-methylphenyl)amino].

According to a further preferred embodiment, the composition includes 17.0% by weight of bisphenol A bis(allyl carbonate), 10.0% by weight of HDDMA, 21.0% by weight of TTEGDA, 32.0% by weight of TAPGDA, and 20.0% by weight of TMPTA. The composition may also include 0.0095% by weight of 1-hydroxycyclohexylphenyl ketone, 0.0356% by weight of methyl benzoylformate, and 0.16 ppm of 9,10-anthracenedione, 1-hydroxy-4-[(4-methylphenyl)amino].

As discussed above, bisphenol A bis(allyl carbonate) has a higher refractive index than DEG-BAC and thus allows the production of thinner lenses when compared to DEG-BAC lenses.

TTEGDA, available from Sartomer and Radcure, is a diacrylate monomer that, preferably, is included in the composition because it is a fast polymerizing monomer that reduces yellowing and yields a very clear product. If too much TTEGDA is included in the most preferred composition, i.e. greater than about 25% by weight, however, the finished lens may be prone to cracking and may be too flexible as this material softens at temperatures above 40° C. If TTEGDA is excluded altogether, the finished lens may to be brittle.

HDDMA, available from Sartomer, is a dimethacrylate monomer that has a very stiff backbone between the two methacrylate groups. HDDMA, preferably, is included in the composition because it yields a stiffer polymer and increases the hardness and strength of the finished lens. This material is quite compatible with the bisphenol A bis(allyl carbonate) monomer. HDDMA contributes to high temperature stiffness, polymer clarity and speed of polymerization.

TRPGDA, available from Sartomer and Radcure, is a diacrylate monomer that, preferably, is included in the composition because it provides good strength and hardness without adding brittleness to the finished lens. This material is also stiffer than TTEGDA.

TMPTA, available from Sartomer and Radcure, is a triacrylate monomer than, preferably, is included in the composition because it provides more crosslinking in the finished lens than the difunctional monomers. TMPTA has a shorter backbone than TTEGDA and increases the high temperature stiffness and hardness of the finished lens. Moreover, this material contributes to the prevention of optical distortions in the finished lens. TMPTA also contributes to high shrinkage during polymerization. The inclusion of too much of this material in the most preferred composition may make the finished lens too brittle.

Certain of the monomers that are preferably utilized in the composition of the present invention, such as TTEGDA,, TRPGDA and TMPTA, include impurities and have a yellow color in certain of their commercially available forms. The yellow color of these monomers is preferably reduced or removed by passing them through a column of alumina (basic) which includes aluminum oxide powder -basic. After passage through the alumina column, the monomers absorb almost no ultraviolet light. Also after passage through the alumina column differences between monomers obtained from different sources are substantially eliminated. It is preferred, however, that the monomers be obtained from a source which provides the monomers with the least amount of impurities contained therein. The composition preferably is filtered prior to polymerization thereof to remove suspended particles.

The composition of the present invention, preferably, may be prepared according to the following protocol. Appropriate amounts of HDDMA, TTEGDA,, TMPTA and TRPGDA are mixed and stirred thoroughly, preferably with a glass rod. The acrylate/methacrylate mixture may then be passed through a purification column.

A suitable purification column may be disposed within a glass column having a fitted glass disk above a teflon stopcock and having a top reservoir with a capacity of approximately 500 ml and a body with a diameter of 22 mm and a length of about 47 cm. The column may be prepared by placing on the fitted glass disk approximately 35 g. of activated alumina (basic), available from ALFA Products, Johnson Matthey, Danvers, Mass. in a 60 mesh form or from Aldrich in a 150 mesh form. Approximately 10 g. of an inhibitor remover (hydroquinone/methylester remover) available as HR-4 from Scientific Polymer Products, Inc., Ontario, N.Y. then may be placed on top of the alumina and, finally, approximately 35 g. of activated alumina (basic) may be placed on top of the inhibitor remover.

Approximately 600 g. of the acrylate/methacrylate mixture may then be added above the column packing. An overpressure of 2–3 psi may then be applied to the top of the column resulting in a flow rate of approximately 30 to 38 grams per hour. Parafilm may be used to cover the junction of the column tip and the receiving bottle to prevent the infiltration of dust and water vapor. The I-Acrylate/methacrylate mixture, preferably, may be received in a container that is opaque to ultraviolet radiation.

An appropriate amount of bisphenol A bis(allyl carbonate) may then be added to the acrylate/methacrylate mixture to prepare the final monomer mixture.

An appropriate amount of a photoinitiator may then be added to the final monomer mixture. The final monomer mixture, with or without photoinitiator, may then be stored in a container that is opaque to ultraviolet radiation.

An appropriate amount of a dye may also be added to the final monomer mixture, with or without photoinitiator.

After edging, the ultraviolet light cured lenses of the present invention demonstrate excellent organic solvent resistance to acetone, methylethyl ketone, and alcohols.

Premature release may occur if the temperature rise of the lens forming composition is uncontrolled. Premature release may also occur if the opposed mold members 78 are held too rigidly by the annular gasket 80. There is preferably sufficient flexibility in the gaskets 80 to permit the mold members 78 to follow the lens as it shrinks. Insufficient sealing, unsuitable gasket material and/or a small residual amount of uncured material have also been found to contribute to premature release failures.

For best results, both the casting surfaces 86 and non-casting surfaces 88 of the mold members 78 are finished to optical quality. For instance, a wave on the non-casting surface 88 may be reproduced in the finished lens as a result of the distortion of the incident light.

Mold markings cause differential light intensity conditions under the marking, even when the mark is on the non-casting surface 88 of the mold members 78. The fully exposed region of the lens will tend to be harder, and the lens may have stresses because of this. The portion of the lens under the mark will also tend to be weaker at the end of the curing period. This effect has been observed and may cause premature release or induce cracking.

Mold defects at the edges interfere with the sealing conditions and frequently induce premature release.

Figure 7:
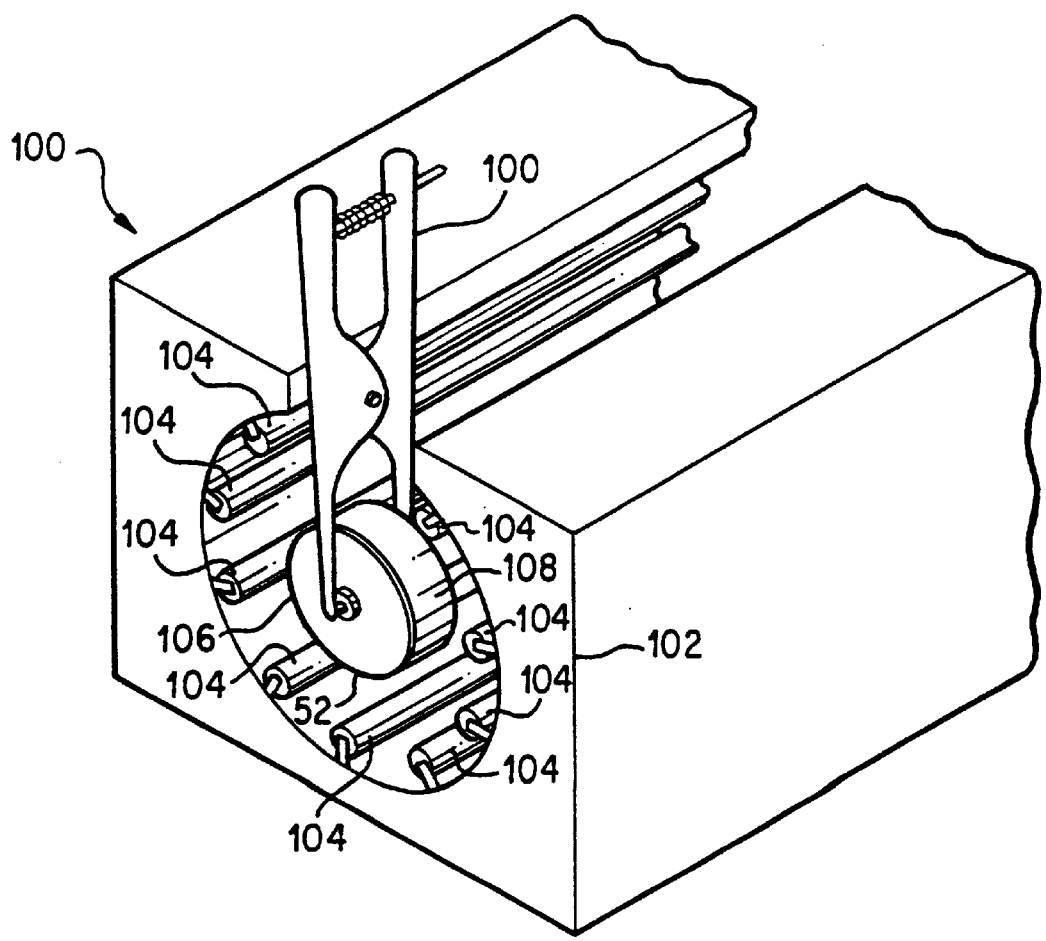
FIG. 7 is a perspective view of an apparatus for producing a plastic lens according to the present invention.

According to the present invention, plastic lenses may be produced by irradiating the lens forming material with ultraviolet light that is prevented from passing through the faces of the opposed mold members 78 and instead passes through the transparent or translucent wall of annular gasket 80 of the lens cell 52. By irradiating in this manner, the thicker edge portion of a negative lens receives a higher level of light intensity than the thinner center portion since the light intensity drops as it passes through the deeper layers of the lens material and glass molds. This method has a desirable advantage of allowing the application of clamping pressure to the front and lack molds, which is useful in controlling premature release. This technique will be referred to as through-the-gasket irradiation. Referring to FIG. 7, apparatus 100 is shown for carrying out through-the-gasket irradiation. Apparatus 100 includes lamp chamber 102 having a plurality of ultraviolet light generating lamps 104 disposed therein. A lens cell 52 in accordance with FIG. 6 is suspended in lamp chamber 102. A cover 106 of opaque material is placed over the non-casting surface 88 of each mold member 78 of the lens cell 52. In this manner, ultraviolet light emanating from the plurality of lamps 104 that is incident upon the lens cell 52 acts upon the lens forming material disposed in the lens molding cavity 82 by passing through the outer wall 108 of the annular gasket 80. A spring-loaded clamp 110, preferably, may be used to apply compression pressure upon the opposed mold members 78 of the lens cell 52. The spring-loaded clamp, preferably, may be adjusted to exert variable pressure upon the opposed mold members 78. Moreover, opaque disks 106 may be disposed between the respective jaws of the clamp 110 and the mold members 78 to prevent scratching of the molds and to prevent light leakage through the mold.

Figure 8:
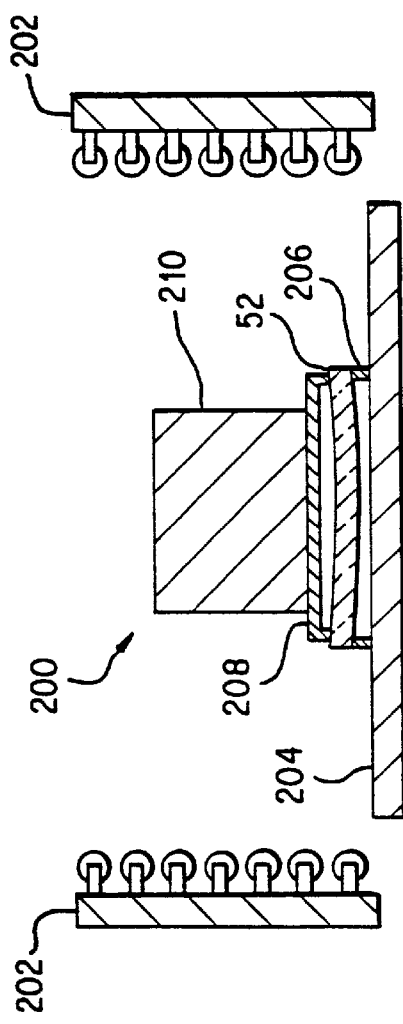
FIG. 8 is a perspective view of an apparatus for producing a plastic lens according to the present invention.

An alternate technique for through-the-gasket irradiation is shown in FIG. 8. Referring to FIG. 8, apparatus 200 is shown for carrying out through-the-gasket irradiation. Apparatus 200 includes opposed lamp arrays 202. A lens cell 52 in accordance with FIG. 6 is placed on a turntable 204 disposed between opposed lamp arrays 202. An annular opaque stage 206 is disposed under the front told member 92 and rests directly on turntable 204. A cap 208 of opaque material is disposed on the back mold member 90. A weight 210 may be disposed upon the back mold member 90 to exert sufficient clamping pressure to prevent premature release.

According to the through-the-gasket irradiation technique, the annular gaskets 80, preferably, are silicone gaskets. Through continued use, however, silicone gaskets tend to become too opaque to allow sufficient ultraviolet light to pass through the gasket to complete the polymerization of the lens forming material. In addition, gaskets having a frosty appearance were observed to yield good quality lenses while gaskets that were clear were observed to yield lenses with optical distortions.

The through-the-gasket irradiation techniques make it relatively easy to exert clamping pressure on the mold members 78. Pressure (up to 30 psi) may be applied to the mold members 78, preferably at or about the onset of gelation of the lens forming material, i.e. after the lens forming material is no longer liquid but before it becomes incompressible. At the beginning of the irradiation when the lens forming material is liquid, however, low clasping pressure (such as 2 lb.) may be applied to the mold members 78, which pressure is not so great that the lens forming material leaks between the gasket 80 and the edges of the mold members 78. These techniques also tend to make it easier to direct evenly distributed ultraviolet light to the lens forming material. The gasket 80 serves as a diffuser and prevents sharp intensity gradients that occur when light is passing through the mold and there is an irregularity in the mold. Since the edge of a lens receives a higher intensity of ultraviolet light than the center of the lens, the through-the-gasket technique, therefore, is quite beneficial for the production of negative lenses. Finally, since ultraviolet radiation does not pass through the mold members 78 according to this technique, metal molds which are more flexible (and which tend to exhibit enhanced heat transfer properties) than glass molds can be utilized.

As discussed above, the likelihood of premature release may be affected by a number of often interrelated factors. Factors such as improper mold cleaning, mold thickness, or gasket/mold design may contribute to premature release. Other factors that may contribute to premature release may include light intensity, the chemical formulations, and the amount and identity of the photoinitiator ("PI"). As discussed above, an additional factor related to premature release is the exothermic heat generated by the reaction.

It is believed that as the reaction proceeds, the heat generated tends to reduce the adhesion between the shrinking lens and the mold face. This reduction in adhesion tends to cause the lens to pull away from the mold. In high curvature (i.e. high power) lenses this problem tends to be even more pronounced because of two factors: (1) these lenses have more thickness and thus more material that is generating heat (which thus speeds up the reaction and generates more heat), and (2) these lenses have a greater thickness differential between the thick and thin portions of the lens, which tends to cause stress on the molds due to differential shrinkage. It is also possible that the temperatures generated relatively deep inside a thick lens may cause some vaporization of the monomer. The vaporized monomer may then migrate to the lens/mold interface, breaking the vacuum between the two.

Because of the problem of premature release, preferably high power lenses are cured to maintain adhesion to the molds. Preferably the molds flex and accommodate stress.

Preferably premature release is controlled by controlling the exothermic reaction heat. This heat is preferably controlled by directing cooling fluid such as air at the mold faces. Thus in a preferred embodiment the invention includes the following steps: (1) placing a polymerizable lens forming material in a mold cavity defined in part between a first mold member and a second mold member, (2) directing ultraviolet rays towards at least one of the first or second mold members, and (3) cooling the first mold member and the second sold member with a fluid. In a preferred embodiment the ultraviolet rays are directed towards the mold member(s) while the first and second mold members are cooled. The above steps may be carried out with an apparatus for making a plastic lens that includes: (1) a first mold member, (2) a second mold member spaced apart from the first mold member, the first and second mold members defining a mold cavity, (3) an ultraviolet light generator for generating and directing ultraviolet light toward at least one of the first and second mold members during use, (4) an ultraviolet light filter disposed between the ultraviolet light generator and the first mold member, and between the ultraviolet light generator and the second mold member, and (5) a distributor for directing cooling fluid to the mold members during use.

Preferably both the first and second mold members are "directly" cooled by the fluid. That is, preferably the face of the first mold member and the face of the second mold member is cooled by directing fluid towards the face of both of the mold members. The "face" of the mold members is the outer mold surface that is not contacting either the gasket or the lens forming materials (see FIG. 6). The fluid may be directed at various angles towards the face of the mold members.

Generally less preferred results are achieved if only one (instead of both) of the mold members is directly cooled. It is believed that directly cooling only one of the mold members tends to result in less preferred lenses because doing so unevenly cools the lens material during curing. Thus preferably the first and second mold members are both substantially evenly exposed to the cooling fluid temperatures and flowrates.

Preferably fluid is directed from the edges of the mold member faces to the center of the mold member faces. In this manner the fluid that contacts the edges of the mold members is approximately the same temperature at all the edges of the mold members, and approximately the same at all radii from the center of the mold members (with some variances due to variances in the cavity thickness at certain radii). Thus substantially the same thicknesses of the lens material are subjected to fluid that is substantially the same temperature, resulting in a more even cooling of the lens material. Generally less favorable results are achieved if fluid is simply directed across the mold members since the fluid temperature and flow rate at the first edge contacted by the fluid may be somewhat different than the fluid temperature and flow rate at the second mold member edge. Specifically, if cooling fluid is passed over the lens forming material in one direction only, the side opposite the source of fluid tends to remain hotter because the fluid passing over it has picked up the heat from the first side.

Preferably the fluid is air at a temperature of less than 50° C., The fluid may be below 0° C., however in a preferred embodiment tie fluid was at a temperature of between 0° C. and less than 20° C., preferably about 0–15° C., more preferably about 0–10° C., more preferably still about 3–8° C. In one preferred embodiment the fluid temperature was about 5° C. As shown in FIG. 9, a lens forming apparatus 300 for making a plastic lens may include a cooler 312 for supplying cool fluid to the apparatus 300 via conduit 314. The fluid may be supplied to the apparatus 300 and then discharged via conduit 320. The fluid discharged via conduit 320 may be vented via conduit 318 or it may alternately be recirculated via conduit 316 to the cooler 312. The cooler 312 preferably includes a Neslab CFT-50 water/antifreeze chiller (Newington, N.H., U.S.A.). A Neslab-built blower box designed for a minimum temperature of 3° C. and 8 cubic feet (about 0.224 cubic meters) per minute of air per air distributor 94 was used with the chiller. The blower box included a heat exchanger coil through which chilled water was circulated, a blower, and a plenum-type arrangement for supplying air to the conduit 314.

If lenses are produced without any mold cooling, the temperature of the mold-lens assembly may rise to above 50° C. Low diopter lenses may be prepared in this fashion, but higher plus or minus diopter lenses may fail. Certain lenses may be made by controlling (e.g., cooling) the temperature of the lens material during cure with circulating uncooled fluid (i.e., fluid at ambient temperatures). The ambient fluid in these systems is directed towards the mold members in the same manner as described above. Circulating ambient temperature fluid permits manufacture of a wider range of prescriptions than manufacture of the lenses without any mold cooling at all. For instance, if the temperature of the circulating air is held at slightly less than room temperature (about 19° C.), prescriptions from +2 to −3 diopter may be successfully cast. Higher diopters, either + or − , often tent to fail without circulating cooled fluid.

Most polymerization factors are interrelated. The ideal temperature of polymerization is related to the diopter and thickness of the lens being cast. Thermal mass is a factor. Lower temperatures (below about 10° C.) are preferred to cast higher + or − diopter lenses. These lower temperatures tend to permit an increase in photoinitiator concentration, which in turn may speed up the reaction and lower curing time.

Preventing premature release is also somewhat dependent upon the flowrates of cooling fluid, as well as its temperature. For instance, if the temperature of the cooling fluid is decreased it may also be possible to decrease the flowrate of cooling fluid. Similarly, the disadvantages of a higher temperature cooling fluid may be somewhat offset by higher flowrates of cooling fluid.

In one embodiment the air flow rates for a dual distributor system (i.e., an air distributor above and below the lens composition are about 1–30 standard cubic feet (about 0.028–0.850 standard cubic meters) per minute per distributor, more preferably about 4–20 cubic feet (about 0.113–0.566 standard cubic meters) per minute per distributor, and more preferably still about 9–15 (about 0.255–0.423 standard cubic meters) cubic feet per minute per distributor. "Standard conditions, " as used herein, means 60° F. (about 15.556° C.) and one atmosphere pressure (about 101.325 kilopascals).

In a preferred embodiment the fluid distributor 94 may include 30 substantially evenly spaced orifices 98 disposed to allow fluid to be directed from the distributor 94 to the mold members. In a preferred embodiment the diameter of fifteen orifices 98 on the one-half of the cylindrical opening 96 closest the plenum portion 95 is about ¼ inch (about 6.35 mm), and the cumulative volume flowrate of air through such orifices is estimated to be about 6.10 standard cubic feet (about 0.173 standard cubic meters) per minute. In the same embodiment the diameter of fifteen orifices 98 on one-half of the cylindrical opening 96 opposite the plenum portion 95 is about 5/16 inch (about 7.94 in.), and the cumulative volume flowrate of air through such orifices is estimated to be about 8.30 standard cubic feet (about 0.235 standard cubic meters) per minute. Thus the total flowrate for one distributor is estimated to be about 14.40 standard cubic feet (about 0.408 standard cubic meters) per minute, and the total flowrate for two distributors is estimated to be about 28.80 standard cubic feet (about 0.816 standard cubic meters) per minute.

In the same embodiment the edge of the orifices 98 in the cylindrical opening 96 are tapered out. In such case the cumulative flowrates for the ¼ inch (6.35 mm) orifices 98 is estimated to be about 5.89 standard cubic feet (about 0.167 standard cubic meters) per minute, and the flowrate for the 5/16 inch (7.94 mm) orifices 98 is estimated to be about 7.02 standard cubic feet about 0.199 standard cubic meters) per minute. Thus the total flowrate for one distributor is estimated to be about 12.91 standard cubic feet (about 0.366 standard cubic meters) per minute, and the total flowrate for two distributors is estimated to be about 25.82 standard cubic feet (about 0.731 standard cubic meters) per minute.

In an alternate preferred embodiment the diameter of fifteen orifices 98 on the one-half of the cylindrical opening 96 closest to the plenum portion 95 are about 3/16 inch (about 4.76 mm), and the cumulative volume flowrate of air through such orifices is estimated to be about 3.47 standard cubic feet (about 0.98 standard cubic meters) per minute. In the same embodiment the diameter of fifteen orifices 98 on the one-half of the cylindrical opening 96 opposite the plenum portion 95 are about ¼ inch (about 6.35 mm), and the cumulative volume flowrate of air through such orifices is estimated to be about 6.17 standard cubic feet (about 0.175 standard cubic meters) per minute. Thus the total flowrate for one distributor is estimated to be about 9.64 standard cubic feet (about 0.273 standard cubic meters) per minute, and the total flowrate for two distributors is estimated to be about 19.28 standard cubic feet (about 0.546 standard cubic meters) per minute.

Actual flowrates through individual orifices 98 tended to vary. The flowrates through the orifices 98 that were closest to or most opposite the plenum portion 95 of air distribution device 94 tended to have a flowrate that is greater than orifices in between these orifices. These higher flowrates varied up to approximately 1.2–2.5 times the flowrate of orifices that were in between the closest to and most opposite orifices.

The above estimated flowrates for orifices 98 in a preferred embodiment were calculated using a bench model of air distributor 94 connected to air flowrate measuring devices. The air flowrates for the orifices 98 in the bench model were measured. The total air flowrate through the bench model distributor 94 was measured. The total air flowrate for a preferred embodiment distributor 94 was measured. The above flowrates were measured by measuring the average velocity across a cross-sectional area, and then multiplying such velocity by the cross-sectional area. The estimated flowrates for the preferred embodiment orifices 98 were obtained by the following equation:

$$P_o = B_o \times (P_A/B_A),$$

where $P_o$=estimated preferred embodiment orifices 98 flowrate, $P_A$=measured preferred embodiment distributor 94 flowrate, $B_o$=measured bench orifices 98 flowrate, and $B_A$=measured bench distributor 94 flowrate.

The thickness of the glass molds used to cast polymerized lenses may affect the lenses produced. A thinner mold tends to allow more efficient heat transfer between the polymerizing material and the cooling air, thus reducing the rate of premature release. In addition, a thinner mold tends to exhibit a greater propensity to flex. A thinner mold tends to flex during the relatively rapid differential shrinkage between the thick and thin portions of a polymerized lens, again reducing the incidence of premature release. In one embodiment the first or second mold members have a thickness less than about 5.0 mm, preferably about 1.0–5.0 mm, more preferably about 2.0–4.0 mm, and more still about 2.5–3.5 mm.

Higher diopter ("D") lenses both have more mass (and so release more heat during the curing cycle) and also define a greater difference between their thick and thin portions than a lower diopter lens. Accordingly, for 74 mm diameter negative lenses stronger than about −2.00 D, it is preferably to reduce the thickness of the front (concave) mold to less than 4 mm and preferably to between 3.0 to 3.5 mm. Corning Glass #9092 mold material tends to exhibit about 50% greater mean deflection value at 3 mm than at 5 mm.

Because a negative lens is thin in the center and thick at the edge, more shrinkage tends to occur at the edge than at the center. Because a hemispherical section of glass will bend more readily toward its radius than away from it, in the case of a minus lens the front mold tends to accommodate the greater shrinkage at the edge by flexing and steepening. A positive lens is just the opposite. The thick section of a plus lens is its center and the edge is thin. The greater shrinkage of the center tends to cause the back (convex) mold to steepen and the front mold to flex very little. In this situation it is preferable to reduce the thickness of the back molds used to cast high diopter positive lenses so as to help reduce the polymerization strain.

The advantages of using a thinner mold are offset somewhat by two disadvantages. Using a thinner mold of the exact radius of curvature as a thicker mold will shift the final focusing power of the finished lens toward the plus side and therefore its radius must be compensated accordingly. Further, thicker molds tend to give better overall optics and show less distortion than the same lens cast with a thin mold.

Preferred mold thicknesses for lenses with a diameter of about 74 mm vary depending on the diopter of the lenses to be formed. For lenses in about the +2.0 to +4.0 diopter range, the front mold thickness is preferably about 2.5–7.0 mm, more preferably about 3.0–5.0 mm, and more preferably still about 3.5–4.0 mm, and the back mold thickness is preferably about 2.0–5.0 mm, more preferably 2.0–4.0 mm, and more preferably still about 2.5–3.0 mm. For lenses in about the zero ("plano") to +2.0 diopter range, the front mold thickness is preferably about 2.5–8.0 mm, more preferably about 3.5–6.0 mm, and more preferably still about 4.0–4.5 mm, and the back mold thickness is preferably about 2.0–8.0 mm, more preferably 3.0–6.0 mm, and more preferably still about 3.5–4.5 mm. For lenses in about the −2.0 to zero diopter range, the front mold thickness is preferably about 2.0–8.0 mm, more preferably about 3.0–6.0 mm, and more preferably still about 3.5–4.5 mm, and the back mold thickness is preferably about 2.5–8.0 mm, more preferably 3.5–6.0 mm, and more preferably still about 4.0–4.5 mm. For lenses in about the −4.0 to −2.0 diopter range, the front mold thickness is preferably about 2.0–6.5 mm, more preferably about 2.6–5.0 mm, and more preferably still about 3.2–4.0 mm, and the back mold thickness is preferably about 2.0–8.0 mm, more preferably 3.0–6.0 mm, and more preferably still about 4.0–4.5 mm. For lenses in about the −6.0 to −4.0 diopter range, the front mold thickness is preferably about 2.0–5.0 mm, more preferably about 2.0–4.0 mm, and more preferably still about 2.5–3.5 mm, and the back mold thickness is preferably about 2.0–8.0 mm, more preferably 3.0–6.0 mm, and more preferably still about 4.0–4.5 mm.

"Front" mold means the mold member with an inner surface that ultimately forms the surface of an eyeglass lens that is furthest from the eye of an eyeglass lens wearer. "Back" mold means the mold member with an inner surface that ultimately forms the surface of an eyeglass lens that is closest to the eye of a eyeglass lens wearer.

To minimize premature release and produce water-white ophthalmic lenses, preferably a lens is initially cured as described above. That is, a lens forming material is preferably initially cured at relatively low temperatures, relatively low ultraviolet light intensity, and relatively low photoinitiator concentrations. "Initial" or "first" cure means the cure that transforms the liquid lens forming material into a solid material. Lenses produced as such generally have a Shore D hardness of about 60–78 (for the preferred compositions) when cured for about 15 minutes as described above. The hardness may be improved to about 80–81 Shore D by postcure heating the lens in a conventional oven for about 10 minutes, as described above. In the initial cure it is difficult to raise the hardness and surface cure of ultraviolet cured lenses above the levels described above. Achieving a higher degree of hardness and cure generally requires a faster, hotter reaction. The faster, hotter initial cure reaction, however, tends to lead to poorer yields and lessened lens optical quality.

In a preferred embodiment of the invention, factors such as the level of cure, rigidity, and hardness of ultraviolet light polymerized lenses may be improved. A method of the invention to improve these factors involves making a lens as described above, demolding the lens, and then subjecting the lens to relatively high intensity ultraviolet light postcure conditions. This method may be carried out using a system partially shown in FIG. 9 including: (i) an apparatus 300 for making a plastic lens which includes (1) a first mold member, (2) a second mold member spaced apart from the first mold member, and the first and second mold members defining a mold cavity, (3) a first ultraviolet light generator for generating and directing ultraviolet light towards at least one of the first and second mold members during use, (4) an ultraviolet light filter disposed between the first ultraviolet light generator and the first mold member, and between the first ultraviolet light generator and the second mold member, and (5) a distributor for directing cooling fluid towards the first and second mold members during use; (ii) a second ultraviolet light generator 304 for generating and directing ultraviolet light towards the lens during use; and (iii) a first heater 306 to heat the lens during use. The system may also include a third ultraviolet light generator 308 for generating and directing ultraviolet light towards the lens during use after the lens has been heated. The system may also include a second heater 310 for heating the lens during use after the third ultraviolet light generator has directed light towards the lens. The system may also include a demolder 302, which may simply include a small hammer and chisel.

In a preferred embodiment the second and third ultraviolet light generators are the same generator. In a preferred embodiment the first and second heaters are the same heater. In a preferred embodiment the first and second heater may be incorporated with the second and third UV light generators. The system may also include additional heaters and or UV light generators.

Preferably the second and/or third ultraviolet light generators provide ultraviolet light at an intensity of about 150–300 mW/cm$^2$, more preferably about 175–250 mW/cm$^2$, at a wavelength range of about 360–370 nm (preferably about 365 nm). Preferably the second and/or third ultraviolet light generators provide ultraviolet light at an intensity of about 50–150 mW/cm$^2$, more preferably about 75–125 mW/cm$^2$, at a wavelength range of about 250–260 nm (preferably about 254 nm). The first or initial ultraviolet light generator preferably provides ultraviolet light at a total intensity (from both sides) of less than 10 mW/cm$^2$ (preferably about 0.3–2.0 mW/cm$^2$). Thus preferably the second or third ultraviolet light generators provide at least about 2, 5, 10, 20, 40, 100, 500, 1000, and/or 1800 times the intensity of ultraviolet light than is provided by the first ultraviolet light generator. Preferably these generators provide about 40–100, 100–500, 500–1800, 100–1800, and/or 40–1800 times the amount of light provided by the first ultraviolet light generator. Preferably the lens is exposed to the ultraviolet light in the second, third and/or subsequent ultraviolet light generators for less than about 5 minutes, more preferably less than 1.0 minute, and more preferably still less than about 30 seconds. Preferably this exposure time is about 0.1–300 seconds, more preferably about 0.1–60 seconds, and more preferably still about 0.1–30 seconds. In another preferred embodiment the exposure time was less than 5 minutes. Generally as the intensity of the light is increased, the exposure time may be decreased, and vice versa.

Preferably the lens is heated in the first or second heaters for less than about 180 minutes, more preferably less than 30 minutes, and more preferably still less than about 10 minutes. Preferably the lens is heated in the second and/or third heaters at a temperature of about 65–180° C., more preferably about 85–140° C., and more preferably still about 100–120° C. Generally as the temperature is decreased, the amount of heating time should be increased, and vice versa. In another preferred embodiment the heating time was less than 5 seconds.

The lens is preferably cleaned (e.g., in a 50 volume % methanol/water solution) prior to exposing the lens to the relatively high intensity light. The relatively high intensity light may include relatively long and/or short wavelengths. The lens may then be heated. The lens may be repeatedly exposed to relatively high intensity ultraviolet light. The lens may be repeatedly heated.

In a preferred embodiment, the high intensity light may be provided with mercury vapor lamps provided in a UVEXS, Inc. Model CCU curing chamber (Sunnyvale, Calif., U.S.A.).

It is believed that shorter wavelengths tend to improve the extent of surface cure and that longer wavelengths tend to increase the extent of cure within the middle portions of the lens. Thus it is preferably to use both shorter and longer ultraviolet light wavelengths for the second and third ultraviolet light generators. Exposure to the relatively high intensity UV wavelengths tends to yellow the lens, however subsequently heating the lens tends to reduce and/or eliminate this yellowing. Preferably the lens is heated to about 110–120° C. Heating also allows radicals to terminate and tends to increase the crosslinking of the compounds within the lens. The polymerization strain also tends to be reduced during heating.

Lenses cured according to the above procedure exhibited a Shore D hardness of above 83, with most lens about 83–85. These lenses also were more rigid and tended to warp less when inserted into an eyeglass frame after edging. There was negligible difference in the impact resistance and scratch resistance of the lenses cured in this fashion, compared to lenses cured without exposure to the relatively high intensity UV light. It is anticipated that the postcure methods described above will tend to remedy lesser defects that may occur in the first cure using the first UV light generator. For instance, the cure level for relatively low mass lenses during the first cure may be less important since the postcure will tend to ensure that the lenses are adequately cured. In like manner, different lens compositions that do not cure to form ophthalmic quality lenses in the first cure may be now usable since the postcure method may increase the quality of the cured lenses. For instance, the amount of photoinitiator and/or stabilizers in the initial composition may be varied over a broader range and still achieve acceptable water-white lenses.

In an alternate method for making a lens, the desired curvature (i.e., power) of the lens may be varied using the same molds, but with different light distributions. In this manner one mold may be used to prepare different lenses with different curvatures. The method includes the steps of: (1) placing a polymerizable lens forming material in a mold cavity defined in part between a first mold member and a second mold member, and wherein the cavity defines a theoretical curvature that is different from the desired curvature, (2) directing ultraviolet rays towards at least one of the first and second mold members, and wherein the ultraviolet rays are directed towards the first or second mold member such that the material cures to form a lens with the desired curvature, and (3) contacting fluid against the first or second mold member to cool the first or second mold member. The resulting lens curvature may vary depending on the way the ultraviolet light is directed towards the first or second mold members. That is, by varying the relative intensity of the light across the lens material radii, it is possible to vary the curvature of the resulting lens.

Lens curvatures may also vary when the lenses are subjected to postcure heating. Thus the curvature of the lenses may be varied by exposing the lens material to UV light, and then demolding and heating the lens. The heating may then result in the desired curvature, and this curvature may be different from the theoretical curvature expected from the dimensions of the mold cavity, as well as the curvature obtained after the lens has been exposed to the initial UV light.

The present invention will now be described in more detail with reference to the following examples. These examples are merely illustrative of the present invention and are not intended to be limiting.

EXAMPLE 1

Lens Curvature (Power) Variances

Lenses were produced under various conditions according to the compositions, methods and apparatus of the present invention.

The formulation used to prepare the lenses according to this example included: 17.0% by weight of CR-73, 10.0% by weight of HDDMA, 21.0% by weight of TTEGDA, 32.0% by weight of TRPGDA, 20.0% by weight of TMPTA, 0.0356% by weight of methyl benzoylformate, 0.0095% by weight of Irgacure 184, and 0.16 ppm of Thermoplast Blue 684. The refractive index of this formulation ranged from 1.468 to 1.478. The refractive index of the lenses produced according to this example ranged from 1.507 to 1.511.

The method used to prepare the lenses according to this example was through the mold irradiation with air-cooling.

The gaskets used to prepare the lenses according to this example were GE SE6035 silicone rubber gaskets.

The molds used to prepare the lenses according to this example were made from Schott S-3 glass and had approximately parallel surfaces averaging 4 mm in thickness.

The intensity of ultraviolet light from the top measured at the center of the lens cell ranged from 0.35 mW/cm$^2$ to 0.37 mW/cm$^2$ for all lenses prepared according to this example. The ultraviolet lamps were kept at a temperature between 78 and 98 F.

For all lenses prepared according to this example, the upper light filter included 2 Pyrex glass sheets each frosted on one side with one sheet of tracing paper between them and the lower light filter also included 2 Pyrex glass sheets each frosted on one side with one sheet of tracing paper between them. In some cases the lower light filter included an opaque disc. The opaque disk tended to decrease the amount of light reaching the mold members, with the decrease maximized at the center of the mold members. The light tended to decrease in lesser amounts at points more distent from the center.

The following curing conditions were constant for all lenses prepared according to this example:
ambient temperature—22° C.
cooling air temperature—23.5° C.
exit air flow rate at vent 33—20 ft$^3$/min.
distance from disk to centerline of stage—38 mm.

The results are shown in Table 1 below. The results of this example for positive lenses demonstrate that as the diameter of the opaque disk at the lower light filter is increased: 1) the bottom light intensity is decreased, 2) the flexing of both the front and back molds is increased, 3) the power of the lenses before and after post-cure is reduced or less positive and, 4) the variance from the predicted power is reduced.

The results for negative lenses demonstrate that as the diameter of the opaque disk at the lower light filter is increased: 1) the bottom light intensity is decreased, 2) the flexing of both the front and back molds was essentially identical, 3) the power of the lenses before and after post-cure is increased or more negative, and, 4) the variance from the predicted power is reduced.

TABLE 1

| disc diameter | bottom light intensity in center mW/cm$^2$ | flexing front mold | flexing back mold | Power upon demolding | Power upon post-cure | Pre-dicted Power | Variance from predicted power |
|---|---|---|---|---|---|---|---|
| 0 | .51 | −.05 | −.09 | +1.82 | +1.92 | +1.80 | +.12 |
| 21 | .44 | −.06 | −.10 | +1.76 | +1.85 | +1.80 | +.05 |
| 39 | .33 | −.09 | −.13 | +1.66 | +1.75 | +1.80 | −.05 |
| 0 | .51 | +.10 | +.04 | −1.80 | −1.91 | −1.98 | +.07 |
| 21 | .44 | +.09 | +.04 | −1.86 | −1.94 | −1.99 | +.05 |
| 39 | .33 | +.07 | +.02 | −1.90 | −1.97 | −1.99 | +.02 |
| 0 | .51 | +.18 | +.06 | −3.72 | −3.94 | −4.02 | +.08 |
| 21 | .44 | +.18 | +.07 | −3.74 | −3.96 | −4.02 | +.06 |
| 39 | .33 | +.14 | +.05 | −3.83 | −4.00 | −4.02 | +.02 |

The results shown in Table 1 clearly demonstrate that the lenses produced according to the present invention are in a stressed condition after ultraviolet light curing. The results also demonstrate that the stressed condition of the lenses may be reduced by an appropriate post-curing heating step. The results also demonstrate that the power of a finished lens produced according to the present invention may be altered by manipulating the intensity of ultraviolet light incident on a lens cell during the curing of a lens.

EXAMPLE 2

Liquid Cooling

As noted above, according to one embodiment of the present invention, the lens cell 52 may be cooled by disposing it in a liquid cooling bath. According to this process a lens was cured under the following conditions: The lens cell was made up of a 5.75 D front mold, a 7.50 D back mold and a silicon rubber gasket. The lens forming composition was 17% CR-73, 20% TMPTA, 21% TTEGDA, 32% TRPGDA, 10% HDDMA, 0.0336% MBZF, and 0.0084 Irgacure 184. The resultant center thickness was 2.4 mm. The lens molding cavity 82 was filled with lens forming material and the lens cell was placed on a supporting stage in a bath of 85% $H_2O$ with 15% propylene glycol at 0° C. A triangular array of ultraviolet lamps was utilized and the incident light intensity was 2.8 $mW/cm^2$ from the top and 1.5 $mW/cm^2$ from the bottom. The lens cell was irradiated for 10 minutes and the resultant lens had a measured focusing power of −1.80 D. The lens did not release and exhibited excellent stress patterns. The Shore D hardness was 67.

EXAMPLE 3

Through the Gasket Curing

As noted above, according to one embodiment of the present invention, the lens forming material can be polymerized by irradiating only through the gasket. The lens forming composition was 26% CR-73, 25% HDDMA, 16% TMPTA, 15% TTEGDA, 16% TRPGDA, 2% styrene, 0.03% Irgacure 184, and about 0.3 ppm of Thermoplast Blue. According to this technique, a lens cell including a soft silicone rubber gasket configured for creating a −4.25 D lens was suspended in the center of a cylindrical array of Sylvania fluorescent F-15 8T/2052 lamps positioned at a distance from the lens cell to create an average light intensity of approximately 2 $mw/cm^2$ on the gasket 80 of the lens cell 52. The sample was irradiated for 40 minutes with 16 pounds of pressure being applied after 13 minutes of irradiation. The pressure was later increased to a total of 21.5 pounds. The lens did not release, gave excellent stress patterns and good optics.

EXAMPLE 4

Reduced Temperature Curing

| Formulation: |
| --- |
| 17% Bisphenol A BisAllyl Carbonate |
| 10% 1,6 Hexanediol dimethacrylate |
| 20% Trimethylolpropane triacrylate |
| 21% Tetraethyleneglycol diacrlate |
| 32% Tripropyleneglycol diacrlyate |
| 0.012% 1 Hydroxycyclohexyl phenyl ketone |
| 0.048 Methylbenzoylformate |
| <10 PPM Hydroquinone & Methylethylhydroquinone |

Hydroquinone and Methylethylhydroquinone were stabilizers present in some of the diacrylate and/or triacrylate compounds obtained from Sartomer. Preferably the amount of stabilizers is minimized since the stabilizers affect the rate and amount of curing. If larger amounts of stabilizers are added, then generally larger amounts of photoinitiators must also be added.

Light Condition: $mW/cm^2$ measured at plane of sample

|  | Center | Edge |
| --- | --- | --- |
| Top: | 0.233 | 0.299 |
| Bottom: | 0.217 | 0.248 |

Air Flow: 9.6 standard cubic feet ("CFM") per manifold/ 19.2 CFM total on sample Air Temperature: 4.4 degrees Centigrade Molds: 80 mm diameter Corning #8092 glass

|  | Radius | Thickness |
| --- | --- | --- |
| Concave: | 170.59 | 2.7 |
| Convex: | 62.17 | 5.4 |

Gasket: General Electric SE6035 silicone rubber with a 3 mm thick lateral lip dimension and a vertical lip dimension sufficient to provide an initial cavity center thickness of 2.2 mm.

Filling: The molds were cleaned and assembled into the gasket. The mold/gasket assembly was then temporarily positioned on a fixture which held the two molds pressed against the gasket lip with about 1 kg. of pressure. The upper edge of the gasket was peeled back to allow about 27.4 grams of the monomer blend to be charged into the cavity. The upper edge of the gasket was then eased back into place and the excess monomer was vacuumed out with a small aspirating device. It is preferable to avoid having monomer drip onto the noncasting surface of the mold because a drop tends to cause the ultraviolet light to become locally focused and may cause an optical distortion in the final product.

Curing: The sample was irradiated for fifteen minutes under the above conditions and removed from the curing chamber. The molds were separated from the cured lens by applying a sharp impact to the junction of the lens and the convex mold. The sample was then postcured at 110° C. in a conventional gravity type thermal oven for an additional ten minutes, removed and allowed to cool to room temperature.

Results: The resulting lens measured 72 mm in diameter, with a central thickness of 2.0 mm, and an edge thickness of 9.2 mm. The focusing power measured −5.05 diopter. The lens was water clear ("water-white"), showed negligible haze, exhibited total visible light transmission of about 94%, and gave good overall optics. The Shore D hardness was about 80. The sample withstood the impact of a 1 inch steel ball dropped from fifty inches in accordance with ANSI 280.1-1987, 4.6.4 test procedures.

EXAMPLE 5

Reduced Temperature Curing

| Formulation: |
| --- |
| 17% Bisphenol A BisAllyl Carbonate |
| 10% 1,6 Hexanediol dimethacrylate |

-continued

| Formulation: | |
|---|---|
| 20% | Trimethylolpropane triacrylate |
| 21% | Tetraethyleneglycol diacrlate |
| 32% | Tripropyleneglycol diacrlyate |
| 0.012% | 1 Hydroxycyclohexyl phenyl ketone |
| 0.048% | Methylbenzoylformate |
| <10 PPM | Hydroquinone & Methylethylhydroquinone |

Light Condition: $mW/cm^2$ measured at plane of sample

| | Center | Edge |
|---|---|---|
| Top: | 0.251 | 0.330 |
| Bottom: | 0.236 | 0.265 |

Air Flow: 9.6 CFM per manifold/19.2 CM total on sample
Air temperature: 4.4 degrees Centigrade
Molds: 80 mm dia. Corning #8092 glass

| | Radius | Thickness |
|---|---|---|
| Concave: | 113.28 | 3.2 |
| Convex: | 78.64 | 5.5 |

Gasket: General Electric SE6035 silicone rubber with a 3 mm thick lateral lip dimension and a vertical lip dimension sufficient to provide a initial cavity center thickness of 1.9 mm.

Filling: The molds were cleaned and assembled into the gasket. The mold/gasket assembly was them temporarily positioned on fixture which held the two molds pressed against the gasket lip with about 1 kg. of pressure. The upper edge of the gasket was peeled back to allow about 15.1 grams of the monomer blend to be charged into the cavity. The upper edge of the gasket was then eased back into place and the excess monomer was vacuumed out with a small aspirating device. It is preferable to avoid having monomer drip onto the noncasting surface of the mold because a drop will cause the ultraviolet light to become locally focused too strongly on the monomer in the cavity and may cause an optical distortion in the final product.

Curing: The sample was irradiated for fifteen minutes under the above conditions and removed from the curing chamber. The molds were separated from the cured lens by applying a sharp impact to the junction of the lens and the convex mold. the sample was then postcured at 110 degrees C. in a conventional gravity type thermal oven for an additional ten minutes, removed and allowed to cool to room temperature.

Results: The resulting lens measured 73 mm in diameter, with a central thickness of 1.7 mm, and an edge thickness of 4.3 mm. The focusing power measured −1.90 diopters. The lens was water clear, showed no haze, exhibited total visible light transmission of 94%, and gave good overall optics. The Shore D hardness was 81. The sample withstood the impact of a 7/8 inch steel ball dropped from fifty inches in accordance with ANSI 280.1-1987, 4.6.4 test procedure.

EXAMPLE 6

Reduced Temperature Curing

| Formulation: | |
|---|---|
| 17% | Bisphenol A BisAllyl Carbonate |
| 10% | 1,6 Hexanediol dimethacrylate |
| 20% | Trimethylolpropane triacrylate |
| 21% | Tetraethyleneglycol diacrlate |
| 32% | Tripropyleneglycol diacrlyate |
| 0.012% | 1 Hydroxycyclohexyl phenyl ketone |
| 0.048% | Methylbenzoylformate |
| <10 PPM | Hydroquinone & methylethylhydroquinone |

Light Condition: $mW/cm^2$ measured at plans of sample

| | Center | Edge |
|---|---|---|
| Top: | 0.233 | 0.299 |
| Bottom: | 0.217 | 0.248 |

Air Flow: 9.6 CFM per manifold/19.2 CFM total on sample
Air Temperature: 12.3 degrees Centigrade
Molds: 80 mm dia. Corning #8092 glass

| | Radius | Thickness |
|---|---|---|
| Concave: | 170.59 mm | 2.7 mm |
| Convex: | 62.17 mm | 5.4 mm |

Gasket: General Electric SE6035 silicone rubber with a 3 mm thick lateral lip dimension and a vertical lip dimension sufficient to provide an initial cavity center thickness of 2.2 mm.

Filling: The molds were cleaned and assembled into the gasket. The mold/gasket assembly was then temporarily positioned on fixture which held the two molds pressed against the gasket lip with about 1 kg. of pressure. The upper edge of the gasket was peeled back to allow about 27.4 grams of the monomer blend to be charged into the cavity. The upper edge of the gasket was then eased back into place and the excess monomer was vacuumed out with a small aspirating device. It is preferable to avoid having monomer drip onto the noncasting surface of the mold because a drop will cause the ultraviolet light to become locally focused too strongly on the monomer in the cavity and may cause an optical distortion in the final product.

Curing: The sample was irradiated for fifteen minutes under the above conditions and removed from the curing chamber.

Results: The sample was found to have released from the front mold prematurely. The sample also showed signs of heat bubbling around the edges.

EXAMPLE 7

Reduced Temperature Curing

| Formulation: |
|---|
| 17% Bisphenol A BisAllyl Carbonate |
| 10% 1,6 Hexanediol dimethacrylate |
| 20% Trimethylolpropane triacrylate |
| 21% Tetraethyleneglycol diacrlate |
| 32% Tripropyleneglycol diacrlyate |
| 0.012% 1 Hydroxycyclohexyl phenyl ketone |
| 0.048% Methylbenzoylformate |
| <10 PPM Hydroquinone & Methylethylhydroquinone |

Light Condition: $mW/cm^2$ measured at plane of sample

|  | Center | Edge |
|---|---|---|
| Top: | 0.251 | 0.330 |
| Bottom: | 0.236 | 0.265 |

Air Flow: 9.6 CFM per manifold/19.2 CFM total on sample
Air Temperature: 12.3 degrees Centigrade
Molds: 80 mm dia. Corning #8092 glass

|  | Radius | Thickness |
|---|---|---|
| Concave: | 123.28 mm | 3.2 mm |
| Convex: | 78.64 mm | 5.5 mm |

Gasket: General Electric SE6035 silicone rubber with a 3 mm thick lateral lip dimension and a vertical lip dimension sufficient to provide an initial cavity center thickness of 1.9 mm.

Filling: The molds were cleaned and assembled into the gasket. The mold/gasket assembly was then temporarily positioned on fixture which held the two molds pressed against the gasket lip with about 1 kg. of pressure. The upper edge of the gasket was peeled back to allow about 15.1 grams of the monomer blend to be charged into the cavity. The upper edge of the gasket was then eased back into place and the excess monomer was vacuumed out with a small aspirating device. It is preferable to avoid having monomer drip onto the noncasting surface of the mold because a drop will cause the ultraviolet light to become locally focused too strongly on the monomer in the cavity and may cause an optical distortion in the final product.

Curing: The sample was irradiated for fifteen minutes under the above conditions and removed from the curing chamber. The molds were separated from the cured lens by applying a sharp impact to the junction of the lens and the convex mold. The sample was then postcured at 110 degrees C. in a conventional gravity type thermal oven for an additional ten minutes, removed and allowed to cool to room temperature.

Results: The resulting lens measured 73 mm in diameter, with a central thickness of 1.7 mm, and an edge thickness of 4.3 mm. The focusing power measured −1.90 diopters. The lens was water clear, showed no haze, exhibited total visible light transmission of 94%, and gave good overall optics. The Shore D hardness was 81. The sample withstood the impact of a ⅞ inch steel ball dropped from fifty inches in accordance with ANSI 280.1-1987, 4.6.4 test procedure.

EXAMPLE 8

Reduced Temperature Curing

| Formulation: |
|---|
| 17% Bisphenol A BisAllyl Carbonate |
| 10% 1,6 Hexanediol dimethacrylate |
| 20% Trimethylolpropane triacrylate |
| 21% Tetraethyleneglycol diacrlate |
| 32% Tripropyleneglycol diacrlyate |
| 0.009% 1 Hydroxycyclohexyl phenyl ketone |
| 0.036% Methylbenzoylformate |
| <10 PPM Hydroquinone & Methylethylhydroquinone |

Light Condition: $mW/cm^2$ measured at plane of sample

|  | Center | Edge |
|---|---|---|
| Top: | 0.233 | 0.299 |
| Bottom: | 0.217 | 0.248 |

Air Flow: 9.6 CFM per manifold/19.2 CFM total on sample
Air Temperature: 12.2 degrees Centigrade
Molds: 80 mm dia. Corning #8092 glass

|  | Radius | Thickness |
|---|---|---|
| Concave: | 170.59 mm | 2.7 mm |
| Convex: | 62.17 mm | 5.4 mm |

Gasket: General Electric SE6035 silicone rubber with a 3 mm thick lateral lip dimension and a vertical lip dimension sufficient to provide an initial cavity center thickness of 2.2 mm.

Filling: The molds were cleaned and assembled into the gasket. The mold/gasket assembly was then temporarily positioned on fixture which held the two molds pressed against the gasket lip with about 1 kg. of pressure. The upper edge of the gasket was peeled back to allow about 27.4 grams of the monomer blend to be charged into the cavity. The upper edge of the gasket was then eased back into place and the excess monomer was vacuumed out with a small aspirating device. It is preferable to avoid having monomer drip onto the noncasting surface of the mold because a drop will cause the ultraviolet light to become locally focused too strongly on the monomer in the cavity and may cause an optical distortion in the final product.

Curing: The sample was irradiated for fifteen minutes under the above conditions and removed from the curing chamber. The molds were separated from the cured lens by applying a sharp impact to the junction of the lens and the convex mold. The sample was then postcured at 110 degrees C in a conventional gravity type thermal oven for an additional ten minutes, removed and allowed to cool at room temperature.

Results: The resulting lens measured 72 mm in diameter, with a central thickness of 2.0 mm, and an edge thickness of 9.2 mm. The focusing power measured ~5.05 diopters. The lens was water clear, showed no haze, exhibited total visible light transmission of 94%, and gave good overall optics. The Shore D hardness was 80.5. The sample withstood the impact of a 1 inch steel ball dropped from fifty inches in accordance with ANSI 280.1-1987, 4.6.4 test procedure.

EXAMPLE 9

Reduced Temperature Curing

Formulation:

17% Bisphenol A BisAllyl Carbonate
10% 1,6 Hexanediol dimethacrylate
20% Trimethylolpropane triacrylate
21% Tetraethyleneglycol diacrlate
32% Tripropyleneglycol diacrlyate
0.012% 1 Hydroxycyclohexyl phenyl ketone
0.048% Methylbenzoylformate
<10 PPM Hydroquinone & Methylethylhydroquinone Light Condition: mW/cm$^2$ measured at plane of sample

|  | Center | Edge |
|---|---|---|
| Top: | 0.251 | 0.330 |
| Bottom: | 0.236 | 0.265 |

Air Flow: 9.6 CFM per manifold/19.2 CFM total on sample
Air Temperature: 22.2 degrees Centigrade
Molds: 80 mm dia. Corning #8092 glass

|  | Radius | Thickness |
|---|---|---|
| Concave: | 113.28 mm | 3.2 mm |
| Convex: | 78.64 mm | 5.5 mm |

Gasket: General Electric SE6035 silicone rubber with a 3 mm thick lateral lip dimension and a vertical lip dimension sufficient to provide an initial cavity center thickness of 1.9 mm.

Filling: The molds were cleaned and assembled into the gasket. The mold/gasket assembly was then temporarily positioned on fixture which held the two molds pressed against the gasket lip with about 1 kg. of pressure. The upper edge of the gasket was peeled back to allow about 15.1 grams of the monomer blend to be charged into the cavity. The upper edge of the gasket was then eased back into place and the excess monomer was vacuumed out with a small aspirating device. It is preferably to avoid having monomer drip onto the noncasting surface of the mold because a drop will cause the ultraviolet light to become locally focused too strongly on the monomer in the cavity and may cause an optical distortion in the final product.

Curing: The sample was irradiated for fifteen minutes under the above conditions and removed from the curing chamber. The molds were separated from the cured lens by applying a sharp impact to the junction of the lens and the convex mold. The sample was then postcured at 110 degrees C in a conventional gravity type thermal oven for an additional ten minutes, removed and allowed to cool to room temperature.

Results: The resulting lens measured 73 mm in diameter, with a central thickness of 1.7 mm, and an edge thickness of 4.3 mm. The focusing power measured ~1.87 diopters. The lens was water clear, showed no haze, exhibited total visible light transmission of 94%, and gave good overall optics. The Shore D hardness was 83. The sample withstood the impact of a 1 inch steel ball dropped from fifty inches in accordance with ANSI 280.1-1987, 4.6.4 test procedure.

EXAMPLE 10

Reduced Temperature Curing

Formulation:

17% Bisphenol A BisAllyl Carbonate
10% 1,6 Hexanediol dimethacrylate
20% Trimethylolpropane triacrylate
21% Tetraethyleneglycol diacrlate
32% Tripropyleneglycol diacrlyate
0.009% 1 Hydroxycyclohexyl phenyl ketone
0.036% Methylbenzoylformate
<10 PPM Hydroquinone & Methylethylhydroquinone Light Condition: Mw/cm$^2$ measured at plane of sample

|  | Center | Edge |
|---|---|---|
| Top: | 0.233 | 0.299 |
| Bottom: | 0.217 | 0.248 |

Air Flow: 9.6 CFM per manifold/19.2 CFM total on sample
Air Temperature: 22.2 degrees Centigrade
Molds: 80 mm dia. Corning #8092 glass

|  | Radius | Thickness |
|---|---|---|
| Concave: | 170.59 mm | 2.7 mm |
| Convex: | 62.17 mm | 5.4 mm |

Gasket: General Electric SE6035 silicone rubber with a 3 mm thick lateral lip dimension and a vertical lip dimension sufficient to provide an initial cavity center thickness of 2.2 mm.

Filling: The molds were cleaned and assembled into the gasket. The mold/gasket assembly was then temporarily positioned on fixture which held the two molds pressed against the gasket lip with about 1 kg. of pressure. The upper edge of the gasket was peeled back to allow about 27.4 grams of the monomer blend to be charged into the cavity. The upper edge of the gasket was then eased back into place and the excess monomer was vacuumed out with a small aspirating device. It is preferably to avoid having monomer drip onto the noncasting surface of the mold because a drop will cause the ultraviolet light to become locally focused too strongly on the monomer in the cavity and may cause an optical distortion in the final product.

Curing: The sample was irradiated for fifteen minutes under the above conditions and removed from the curing chamber.

Results: The sample was found to have released from the molds prematurely. It also showed heat bubbles at the edge.

EXAMPLE 11

High Intensity UV Postcure—1 Composition

A number of lenses were prepared with the same physical molds and gasket, with the same lens forming composition, and under identical initial UV light curing conditions. These lenses were then subjected to various combinations of second and/or third UV intensity/time and temperature/time conditions. The results for Shore D hardness and impact resistance of each lens are shown in Table 2. The second or third UV source was a UVEXS CCU curing chamber configured with a medium pressure vapor lamp, a collimated dichroic reflector which reduced the IR radiation of the lamp by 50%, and two selectable output levels. The low setting provides approximately 175 mW/cm$^2$ at about 365 nm and 70 mW/cm$^2$ at about 254 nm. The high setting produces about 250 mW/cm$^2$ at about 365 nm and 100 mW/cm$^2$ at about 254 nm. The initial curing conditions are identified below.

| Formulation: | |
|---|---|
| 17% | Biaphenol A BisAllyl Carbonate |
| 10% | 1,6 Hexanediol dimethacrylate |
| 20% | Trimethylolpropane triacrylate |
| 21% | Tetraethyleneglycol diacrlate |
| 32% | Tripropyleneglycol diacrlyate |
| 0.012% | 1 Hydroxycyclohexyl phenyl ketone |
| 0.048 | Methylbenzoylformate |
| <10 PPM | Hydroquinone & Methylethylhydroquinone |

Initial Cure Light Condition: Mw/cm$^2$ measured at plane of sample

| | Center | Edge |
|---|---|---|
| Top: | 0.251 | 0.330 |
| Bottom: | 0.236 | 0.265 |

Air Flow: 9.6 CFM per manifold/19.2 CFM total on sample
Air Temperature: 4.8 degrees Centigrade
Molds: 80 mm dia. Corning #8092 glass

| | Radius | Thickness |
|---|---|---|
| Concave: | 113.22 | 3.2 |
| Convex: | 78.52 | 5.2 |

Lens Power: −1.90 D
Lens Thickness: 2.2 mm
Lens Diameter: 73 mm
Gasket: General Electric SE6035 silicone rubber with a 3 mm thick lateral lip dimension and a vertical lip dimension sufficient to provide an initial cavity center thickness of 2.4 mm.

Curing: The sample was irradiated for fifteen minutes under the above conditions and removed from the curing chamber. The molds were separated from the cured lens by applying a sharp impact to the junction of the lens and the convex mold. The sample was then postcured as described. Unless otherwise indicated, the stated "hard" or high intensity UV postcure time/intensity doses were applied twice—i.e., first to the convex surface and then to the concave surface for each exposure. For example, if the dose is described as "1.4 sec/low", it means that the front surface of the lens was exposed for 1.4 seconds to the low intensity rays and then the lens was turned over and the back was exposed for the same length of time to the same intensity level of light. The term "CX" means convex, the term "CC" means concave, the term "HD" means Shore D hardness, "pass" means the lens passed the 1" steel ball impact resistance test described in the previous examples (see e.g., example 9), "2nd UV" means the first UV postcure light (the initial cure was the "1st UV"), and "3rd UV" means the second UV postcure light. Time units are in minutes, unless "sec" for seconds is specified. Temperature is defined in degrees Centigrade.

TABLE 2

HIGH INTENSITY UV/THERMAL POSTCURE EXAMPLES

| # | 2nd UV Lamp Time/Intensity | 1st Thermal Postcure Time/Temp | 3rd UV Lamp Time/Intensity | 2nd Thermal Postcure Time/Temp | Shore D Hardness | Impact 1" Ball |
|---|---|---|---|---|---|---|
| 1 | 0 | 0 | 0 | 0 | 65 | — |
| 2 | 0 | 10:00/115° C. | 0 | 0 | 80 | Pass |
| 3 | 1.4 sec/low | 10:00/115° C. | 0 | 0 | 82 | 7/8" |
| 4 | 0 | 5:00/115° C. | 1.4 sec/low | 5:00/115 C. | 83 | Pass |
| 5 | 1.4 sec/low | 5:00/115° C. | 1.4 sec/low | 5:00/115 C. | 85 | Pass |
| 6 | 1.4 sec/low | 5:00/65° C. | 1.4 sec/low | 5:00/65 C. | 80 | Pass |
| 7 | 1.4 sec/low | 5:00/65° C. | 1.4 sec/low | 15:00/65 C. | 81 | Pass |
| 8 | 1.4 sec/low | 5:00/65° C. | 1.4 sec/low | 25:00/65 C. | 81 | Pass |
| 9 | 1.4 sec/low | 5:00/80° C. | 1.4 sec/low | 5:00/80 C. | 82 | Pass |
| 10 | 1.4 sec/low | 5:00/140° C. | 1.4 sec/low | 5:00/140 C. | 85 | Pass |
| 11 | 1.4 sec/low | 5:00/180° C. | 1.4 sec/low | 5:00/180 C. | 85 | Pass |
| 12 | 12.0 sec/high | 0 | 0 | 0 | 80 | Pass |
| 13 | 12.0 sec/high | 1:00/180° C. | 0 | 0 | 83 | Pass |
| 14 | 12.0 sec/high | 10:00/115° C. | 0 | 0 | 85 | Pass |
| 15 | 12.0 sec/high | 30:00/65° C. | 0 | 0 | 83 | Pass |
| 16 | 12.0 sec/high | 10:00/115° C. | 1.0 sec/low | 0 | 85 | Pass |
| 17 | 1.0 sec/low (Exposed CX side) | 5:00/115° C. | 1.0 sec/low (Exposed CX side) | 5:00/115 C. | 83 | Pass |

TABLE 2-continued

HIGH INTENSITY UV/THERMAL POSTCURE EXAMPLES

| # | 2nd UV Lamp Time/ Intensity | 1st Thermal Postcure Time/Temp | 3rd UV Lamp Time/ Intensity | 2nd Thermal Postcure Time/Temp | Shore D Hardness | Impact 1" Ball |
|---|---|---|---|---|---|---|
| | 1X only, CC side 0 times) | | 1X only, CC side 0 times) | | | |

EXAMPLE 12

High Intensity UV Postcure—Various Compositions

A number of lenses made from different compositions were prepared with the same physical molds and gasket, and under identical initial curing conditions. The lenses were then subjected to fixed postcure procedures with fixed UV intensity/time and temperature/time conditions. It should be noted that each of the acrylic components were passed through an alumina column to remove impurities and inhibitors before use. The results for Shore D hardness after the postcure, and the impact resistance of each product are shown in Table 3. The postcure UV source used was a UVEXS CCU curing chamber configured with a medium pressure vapor lamp, a collimated dichroic reflector which reduced the IR radiation of the lamp by 50%, and two selectable output levels. The low setting provides approximately 175 mW/cm$^2$ at about 365 nm and 70 mW/cm$^2$ at about 254 nm. The high setting produces about 250 mW/cm$^2$ at about 365 mn and 100 mW/cm$^2$ at about 254 nm. The initial curing conditions are identified below.

Initial Cure Light Condition: Mw/cm$^2$ measured at plane of sample

| | Center | Edge |
|---|---|---|
| Top: | 0.233 | 0.299 |
| Bottom: | 0.217 | 0.248 |

Air Flow: 9.6 CFM per manifold/19.2 CFM total on sample
Air Temperature: 4.8 degrees Centigrade
Molds: 80 mm dia. Corning #8092 glass

| | Radius | Thickness |
|---|---|---|
| Concave: | 113.22 | 3.2 |
| Convex: | 78.52 | 5.2 |

Lens Power: −1.90 D
Lens Thickness: 2.2 mm
Lens Diameter: 73 mm
Gasket: General Electric SE6035 silicone rubber with a 3 mm thick lateral lip dimension and a vertical lip dimension sufficient to provide an initial cavity center thickness of 2.4 mm.
Curing: The sample was irradiated for fifteen minutes under the above conditions and removed from the curing chamber. The molds were separated from the cured lens by applying a sharp impact to the junction of the lens and the convex mold. The lens was then postcured by first exposing it to the low power setting in the UVEXS curing chamber (1.4 seconds each side after demolding). The sample was then placed in the thermal oven for five minutes at 115 degrees Centigrade, removed from the oven, and once again exposed for 1.4 seconds to the postcure UV at the low power setting. It was then returned to the thermal oven for another five minutes at 115 degrees Centigrade. The postcure UV doses were applied first to the convex surface and then to the concave surface for each exposure. For example, if the dose is described as "1.4 sec/low", it means that the front surface of the lens was exposed for 1.4 seconds to the low intensity and then the lens was turned over and the back was exposed for the same length of time at the same intensity level. The impact resistance ("I/R") of each lens was pursuant to ANSI standards, as described for the other examples. The lenses were first treated with a ⅝" diameter steel ball bearing, a ⅞ steel ball bearing, and then a 1" steel ball bearing. The maximum diameter of ball bearing that the sample survived the impact of is described below. "CR-73" means bispherol A bis(allyl carbonate), "MBZF" means methyl benzoylformate, "Irg. 184" means Irgacure 184.

TABLE 3

| Composition | % | % MBZF | % Irg. 184 | Total PI % | Shore D hardness after 1st UV | Final Shore D Hardness | I/R |
|---|---|---|---|---|---|---|---|
| CR-73 | 20% | 0.086 | 0.265 | 0.351 | 57 | 85–86 | 1" |
| HDDMA | 80% | | | | | | |
| CR-73 | 20% | 0.0257 | 0.0064 | 0.0321 | 55 | 70 | 1" |
| TTEGDA | 80% | | | | | | |
| CR-73 | 20% | 0.025 | 0.0062 | 0.031 | 48 | 75 | 1" |
| TRPGDA | 80% | | | | | | |
| CR-73 | 20% | 0.0461 | 0.0115 | 0.0576 | 50 | 87 | ⅝" |
| TMPTA | 80% | | | | | | |
| TMPTA | 90% | 0.054 | 0.014 | 0.068 | 72 | 88 | ⅞" |
| TRPGDA | 10% | | | | | | |
| TRPGDA | 90% | 0.0274 | 0.0068 | 0.0342 | 68–70 | 82 | 1" |
| TMPTA | 10% | | | | | | |
| TMPTA | 36.5% | 0.096 | 0.048 | 0.144 | 68 | 87 | 1" |
| HDDMA | 24.4% | | | | | | |
| TRPGDA | 39.1% | | | | | | |
| TMPTA | 30% | 0.062 | 0.021 | 0.083 | 67 | 87 | 1" |
| HDDMA | 10% | | | | | | |
| TRPGDA | 60% | | | | | | |
| TMPTA | 30% | 0.0295 | 0.0074 | 0.0369 | 65 | 85 | 1" |
| CR-73 | 15% | | | | | | |
| TTEGDA | 22% | | | | | | |
| TRPGDA | 33% | | | | | | |
| HDDMA | 100% | 0.108 | 0.331 | 0.439 | 64–66 | 86–87 | 1" |
| HDDMA | 94% | 0.12 | 0.16 | 0.28 | 50 | 86 | 1" |
| CR-73 | 1.14% | | | | | | |
| TMPTA | 1.34% | | | | | | |
| TTEGDA | 1.41% | | | | | | |
| TRPGDA | 2.14% | | | | | | |
| TTEGDA | 100% | 0.01 | 0.0025 | 0.0125 | 58–60 | 77 | 1" |
| TTEGDA | 98.4% | 0.059 | 0.015 | 0.074 | 70 | 78 | 1" |
| CR-73 | 0.3% | | | | | | |
| HDDMA | 0.2% | | | | | | |
| TMPTA | 0.4% | | | | | | |
| TRPGDA | 0.6% | | | | | | |
| TRPGDA | 100% | 0.024 | 0.006 | 0.030 | 66 | 81–82 | 1" |
| CR-73 | 0.13% | 0.0238 | 0.006 | 0.0244 | 67 | 82 | 1" |
| HDDMA | 0.10% | | | | | | |
| TMPTA | 0.15% | | | | | | |

TABLE 3-continued

| Composition | % | % MBZF | % Irg. 184 | Total PI % | Shore D hardness after 1st UV | Final Shore D Hardness | I/R |
|---|---|---|---|---|---|---|---|
| TTEGDA | 0.16% | | | | | | |
| TRPGDA | 99.5% | | | | | | |
| TMPTA | 100% | 0.058 | 0.014 | 0.072 | 56 | 89–91 | 1" |
| TTEGDA | 0.38% | 0.056 | 0.014 | 0.070 | 46 | 87 | 7/8" |
| CR-73 | 0.31% | | | | | | |
| HDDMA | 0.20% | | | | | | |
| TMPTA | 98.6% | | | | | | |
| TRPGDA | 0.58% | | | | | | |
| HDDMA | 100% | 0.668 | — | 0.668 | 45 | 87 | 5/8" |
| HDDMA | 100% | 1.215 | — | 1.215 | 40 | 85 | 5/8" |
| TTEGDA | 100% | 0.018 | — | .018 | 65 | 77 | 1" |
| TRPGDA | 100% | 0.0441 | — | .0441 | 67 | 80 | 1" |
| TMPTA | 100% | 0.064 | — | 0.064 | 60 | 87 | 1" |
| TMPTA | 100% | 0.093 | — | 0.093 | 70 | 91 | 7/8" |
| CR-73 | 14.5% | 0.0377 | — | 0.0377 | 60 | 80 | 1" |
| TRPGDA | 85.5% | | | | | | |
| CR-73 | 13.6% | 0.074 | — | 0.074 | 52 | 85 | 1" |
| TMPTA | 86.4% | | | | | | |
| TMPTA | 31.6% | 0.0205 | — | 0.0205 | 70 | 84 | 1" |
| TTEGDA | 37.2% | | | | | | |
| TRPGDA | 16.7% | | | | | | |
| CR-73 | 14.5% | | | | | | |

The initial UV curing time for each lens was 15 minutes, with the exception of the compositions with only TTEGDA with MBZF and Irgacure 184 (which had an initial curing time of 20 minutes), the compositions with only HDDMA and MBZF (which had an initial curing time of 45 minutes), the composition with only CR-73, TMPTA, and MBZF (which has an initial curing time of 20 minutes). The lenses that resulted were generally all water-white optically clear lenses with negligible yellowing and negligible haziness. The 100% TMPTA and 98.6% TMPTA lenses were slightly yellow but otherwise they were the same as the other lenses. These slightly yellow lens formulations may have the yellowness reduced with the addition of an effective amount of Thermoplast Blue added to the formulation.

Generally speaking, the single component (or primarily single component) lenses had generally less preferred optical qualities. Some of these lenses has slight wave patterns in some portions of the lenses.

It is thus seen that the methods, apparatus and compositions of the present invention provide several advantages. For example, according to certain embodiments of the present invention a plastic optical lens can be cured in 30 minutes or less. Furthermore, in certain embodiments of the present invention, the lens composition includes monomers having a higher refractive index than conventional monomer materials allowing the production of thinner lenses.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the present invention without departing from the spirit and scope of the invention. Of course, other variations can be made by those skilled in the art without departing from the invention as defined by the appended claims.

What is claimed is:

1. Apparatus for making a plastic lens, comprising:
   a) a first mold member having a thickness of less than about 5.0 mm;
   b) a second mold member having a thickness of less than about 5.0 mm and being spaced apart from the first mold member, the first and second mold members each having a face and edges, and the first and second mold members defining a mold cavity;
   c) an ultraviolet light generator for generating and directing ultraviolet light toward at least one of the first and second mold members during use; and
   d) an air cooler adapted to cool air to between 0° C. and less than 20° C., and a distributor for directing cooled air at a temperature of between 0° C. and less than 20° C. toward the faces of the first and second mold members during use.

2. The apparatus of claim 1 wherein the air temperature is about 0–15° C.

3. The apparatus of claim 1 wherein the air temperature is about 0–10° C.

4. The apparatus of claim 1 wherein the air temperature is about 3–8° C.

5. The apparatus of claim 1 wherein the mold cavity is cylindrical and the height of the cavity varies across the diameter of the cavity.

6. The apparatus of claim 5 wherein a filter is disposed between the ultraviolet light generator and at least one mold member, and wherein the filter is positioned to direct ultraviolet light during use with an intensity that varies in proportion to the height of the cavity.

7. The apparatus of claim 1 wherein the distributor is connected to distribute fluid during use towards the faces of the mold members.

8. The apparatus of claim 1 with edges wherein the distributor is connected to distribute fluid during use from the edges of the first mold member to the center of the first mold member, and from the edges of the second mold member to the center of the second mold member.

9. The apparatus of claim 6 wherein the filter comprises a disk of opaque material for reducing the intensity of ultraviolet light reaching the center of the mold members relative to the intensity of ultraviolet light reaching the edge of the mold members during use.

10. The apparatus of claim 6 wherein the filter comprises a ring of opaque material for reducing the intensity of ultraviolet light reaching the edge of the mold members relative to the intensity of ultraviolet light reaching the center of the mold members during use.

11. The apparatus of claim 6 wherein the filter comprises a transparent sheet material having a plurality of ultraviolet light absorbing shapes printed thereon.

12. The apparatus of claim 11 wherein the density per unit area of the shapes is at a minimum at a point corresponding to the greatest distance between the first mold member and the second mold member and wherein the density per unit area of the shapes is at a maximum at a point corresponding to the smallest distance between the first mold member and the second mold member.

13. The apparatus of claim 1 wherein the distributor comprises an air jet having a substantially cylindrical bore, and the bore has a plurality of openings disposed about the circumference thereof.

14. The apparatus of claim 13 wherein the average diameter of the openings in the air jet varies about the circumference of the bore.

15. The apparatus of claim 13 wherein the air jet comprises an air inlet and the diameter of the openings is at a minimum adjacent the air inlet, and the diameter of the openings is at a maximum at a point along the circumference of the bore that is opposite the bores having a minimum diameter.

16. Apparatus for making a plastic lens, comprising:
a) a first mold member;
b) a second mold member spaced apart from the first mold member, and the first and second mold members defining a mold cavity;
c) an ultraviolet light generator for generating and directing ultraviolet light towards at least one of the first and second mold members during use; and
d) a distributor adaptable to direct during use about 1–30 standard cubic feet (about 0.028–0.850 standard cubic meters) per minute of cooling air toward the first mold member to cool the first mold member, and about 1–30 standard cubic feet (about 0.028–0.850 standard cubic meters) per minute of cooling air toward the second mold member to cool the second mold member.

17. The apparatus of claim 16 wherein the distributor is adaptable to direct during use about 4–20 standard cubic feet (about 0.113–0.566 standard cubic meters) per minute towards the first mold member to cool the first mold member, and about 4–20 standard cubic feet (about 0.113–0.566 standard cubic meters) per minute towards the second mold member to cool the second mold member.

18. The apparatus of claim 16 wherein the distributor is adaptable to direct during use about 9–15 standard cubic feet (about 0.255–0.423 standard cubic meters) per minute towards the first mold member to cool the first mold member, and about 9–15 standard cubic feet (about 0.255–0.423 standard cubic meters) per minute towards the second mold member to cool the second mold member.

19. The apparatus of claim 1 wherein the ultraviolet light generator is adapted to generated and direct ultraviolet light of a total intensity of less than about 10 mW/cm$^2$ towards at least one of the first and second mold members during use.

20. The apparatus of claim 16 wherein the ultraviolet light generator is adapted to generated and direct ultraviolet light of a total intensity of less than about 10 mW/cm$^2$ towards at least one of the first and second mold members during use.

21. The apparatus of claim 1 wherein air is directed from an edge of at least one mold member to the center of such mold member.

22. The apparatus of claim 16 wherein the first and second mold members each have a face and edges, and air is directed from an edge of at least one mold member to the center of such mold member.

23. The apparatus of claim 1 wherein the first or second mold member has a thickness of about 2.0–4.0 mm.

24. The apparatus of claim 1 wherein the first or second mold member has a thickness of about 2.5–3.5 mm.

25. The apparatus of claim 16 wherein the first or second mold member has a thickness of about 2.0–4.0 mm.

26. The apparatus of claim 16 wherein the first or second mold member has a thickness of about 2.5–3.5 mm.

27. The apparatus of claim 1 wherein the distributor is adaptable to direct during use about 1–30 standard cubic feet per minute toward at least one mold member to cool such first mold member.

28. The apparatus of claim 1 wherein the distributor is adaptable to direct during use about 1–30 standard cubic feet per minute toward each mold member to cool each mold member.

29. The apparatus of claim 1 wherein the apparatus is adapted to cure a liquid in the mold cavity to form a substantially clear eyeglass lens in less than about 30 minutes.

30. The apparatus of claim 16 wherein the apparatus is adapted to cure a liquid in the mold cavity to form a substantially clear eyeglass lens in less than about 30 minutes.

31. The apparatus of claim 1, wherein an ultraviolet light generator is adapted such that the intensity of ultraviolet light directed towards the center of at least one of the first and second mold members is greater than the intensity of ultraviolet light directed towards an edge of at least one of the first and second mold members.

32. The apparatus of claim 16 wherein an ultraviolet light generator is adapted such that the intensity of ultraviolet light directed towards the center of at least one of the first and second mold members is less than the intensity of ultraviolet light directed towards an edge of at least one of the first and second mold members.

33. The apparatus of claim 16, further comprising and ultraviolet light filter disposed between the ultraviolet light generator and the first mold member, and between the ultraviolet light generator and the second mold member.

34. The apparatus of claim 1 wherein the distributor is adapted to direct cooling air to at least one mold member substantially simultaneously while light is being directed towards a mold member during use.

35. The apparatus of claim 16 wherein the distributor is adapted to direct cooling air to at least one mold member substantially simultaneously while light is being directed towards a mold member during use.

36. An apparatus for making a plastic lens, comprising:
a) a first mold member having a thickness of between about 1.0 and 5.0 mm; and a second mold member having a thickness of between about 1.0 and 5.0 mm and being spaced apart from the first mold member, the first and second mold members defining a mold cavity;
b) an ultraviolet light generator for generating and directing ultraviolet light toward at least one of the first and second mold members during use; and
c) an air cooler for cooling air to between 0° C. and less than 20° C., and a distributor for directing cooling air at between 0° C. and less than 20° C. toward the first and second mold members during use, and wherein the distributor directs cooling air at a rate of less than about 30 standard cubic feet per minute to at least mold member during use.

37. An apparatus for making a plastic lens, comprising:
a) a first mold member having a thickness of between about 1.0 and 5.0 mm; and a second mold member having a thickness of between about 1.0 and 5.0 mm and being spaced apart from the first mold member, and first and second mold members defining a mold cavity;
b) an ultraviolet light generator for generating and directing ultraviolet light toward at least one of the first and second mold members during use; and
c) an air cooler for cooling air to between 0° C. and less than 20° C., and a distributor for directing cooling air at a temperature of between 0° C. and less than 20° C. toward the first and second mold members during use.

38. The apparatus of claim 37 wherein the distributor is adapted to direct cooling air to at least one mold member while light is being substantially simultaneously directed towards a mold member during use.

* * * * *